United States Patent
Kawano

(10) Patent No.: US 8,878,507 B2
(45) Date of Patent: Nov. 4, 2014

(54) CONTROL DEVICE, DIGITAL CONTROL POWER SUPPLY, AND CONTROL METHOD

(71) Applicant: Renesas Electronics Corporation, Kanagawa (JP)

(72) Inventor: Takahiro Kawano, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 79 days.

(21) Appl. No.: 13/765,291

(22) Filed: Feb. 12, 2013

(65) Prior Publication Data

US 2013/0214753 A1 Aug. 22, 2013

(30) Foreign Application Priority Data

Feb. 21, 2012 (JP) .................................. 2012-034846

(51) Int. Cl.
*G05F 1/00* (2006.01)
*G05F 1/575* (2006.01)
(52) U.S. Cl.
CPC ....................................... *G05F 1/575* (2013.01)
USPC .......................................................... 323/283

(58) Field of Classification Search
USPC .................. 323/222, 271, 282, 283, 284, 285
See application file for complete search history.

(56) References Cited

U.S. PATENT DOCUMENTS

| 8,120,345 | B2 * | 2/2012 | Akiyama et al. | 323/283 |
| 2005/0029998 | A1 * | 2/2005 | Brachmann et al. | 323/283 |
| 2007/0096709 | A1 * | 5/2007 | Brown | 323/283 |

FOREIGN PATENT DOCUMENTS

JP  7-131350 A  5/1995

* cited by examiner

*Primary Examiner* — Nguyen Tran
(74) *Attorney, Agent, or Firm* — Foley & Lardner LLP

(57) ABSTRACT

In a digital control power supply, a mode control unit measures a first frequency and a second frequency for a difference between a second digital value and a target value. Based on the measured first frequency and second frequency and a predetermined threshold set to the first and second frequencies, the mode control unit determines whether an amplification factor for use in amplification processing by an amplifier is maintained at a current amplification factor or is changed to an amplification factor which is larger or smaller by 1 than the current amplification factor. This contributes to an improvement in noise resistance of the digital control power supply and prevents an output voltage from being unstable.

20 Claims, 24 Drawing Sheets

CONTROL DEVICE, DIGITAL CONTROL POWER SUPPLY, AND CONTROL METHOD

CROSS-REFERENCE TO RELATED APPLICATIONS

This application is based upon and claims the benefit of priority from Japanese patent application No. 2012-034846, filed on Feb. 21, 2012, the disclosure of which is incorporated herein in its entirety by reference.

BACKGROUND

The present invention relates to a technique for performing digital control of an output of a power supply.

There has been an accelerating trend in recent years toward digitalization in the field of power supply control, because the digitalization of a control circuit of a power supply enables a flexible, highly efficient control.

In a digitally-controlled power supply (hereinafter referred to as "digital control power supply"), an output (voltage or current) of the power supply is converted into a digital code by an A/D converter and is compared with a set target value. Then, a PWM control (PWM: Pulse Wide Modulation) is carried out according to the comparison result to thereby stabilize the output.

As a matter of course, the accuracy of the A/D conversion performed by the A/D converter affects the control accuracy of the digital control power supply.

Japanese Unexamined Patent Application Publication No. 07-131350 discloses a technique for improving the conversion accuracy of the A/D converter. The technique will be described with reference to FIG. 26.

FIG. 26 corresponds to FIG. 1 of Japanese Unexamined Patent Application Publication No. 07-131350. FIG. 26 shows an analog data conversion circuit to which the technique disclosed in Japanese Unexamined Patent Application Publication No. 07-131350 is applied. As shown in FIG. 26, the analog data conversion circuit includes an input terminal 1, an input amplifier 2, an A/D converter 3, a memory 4, a D/A converter 5, an output amplifier 6, an output terminal 7, a conversion control circuit 8, and an amplification control circuit 9. The amplification control circuit 9 includes a maximum value extraction unit 91, a minimum value extraction unit 92, a CPU 95, a D/A converter 96, and a D/A converter 97.

The input amplifier 2 amplifies an input analog signal which is input to the input terminal 1. The A/D converter 3 performs an A/D conversion to convert the input analog signal into an input digital signal. The input digital signal is stored in the memory 4. The input amplifier 2 is an amplifier having a variable amplification factor and connected to the D/A converter 96. The amplification factor of the input amplifier 2 changes with an analog voltage received from the D/A converter 96 as a control voltage.

The A/D converter 3 is an 8-bit A/D converter that compares a reference voltage (a reference top voltage RT and a reference bottom voltage RB) with the input analog signal and performs an A/D conversion. The A/D converter 3 is similar to the A/D converter of related art.

The digital signal stored in the memory 4 is subjected to desired digital processing by a circuit (not shown) and is then stored in the memory 4 again.

The amplification control circuit 9 reads out the input digital signal stored in the memory 4. Values in one cycle of the read input digital signal are compared with each other in the maximum value extraction unit 91, and a maximum value is extracted and given to the CPU 95. Similarly, values in one cycle are compared with each other in the minimum value extraction unit 92, and a minimum value is extracted and given to the CPU 95. Accordingly, the maximum value and the minimum value in one cycle are alternately given to the CPU 95.

The CPU 95 outputs data "n" to control an amplification factor α of the input amplifier 2 to be increased or decreased according to the given value of the maximum value or minimum value. Specifically, when the maximum value is smaller than "254" or when the minimum value is larger than "1", the CPU 95 supplies, to the D/A converter 96, data to control the amplification factor α of the input amplifier 2 to be increased. When the maximum value is equal to "255" or when the minimum value is equal to "0", the CPU 95 supplies, to the D/A converter 96, data to control the amplification factor α of the input amplifier 2 to be decreased. When the maximum value is equal to "254" or when the minimum value is equal to "1", the CPU 95 does not change the data to be supplied to the D/A converter 96 so as to maintain the amplification factor α of the input amplifier 2, and causes the data "n" to be stored into the memory 4.

In summary, the analog data conversion circuit adjusts the amplification factor of the input amplifier 2 by estimating the range of the input analog signals from the input terminal 1 based on the maximum value and the minimum value in one cycle of the digital code obtained as a result of A/D conversion by the A/D converter 3. This enables the range of the signals input to the A/D converter 3 to constantly match the A/D convertible range of the A/D converter 3 (hereinafter referred to as "A/D conversion range").

SUMMARY

In the technique disclosed in Japanese Unexamined Patent Application Publication No. 07-131350, the meaning of the term "one cycle" of the input digital signal is unclear. Since the term "one cycle" generally refers to a period between two consecutive sampling timings of an A/D converter, only one digital signal is obtained per cycle. Therefore, the maximum value and the minimum value in one cycle indicate the one digital signal itself.

In view of the above, the so-called "one cycle" in Japanese Unexamined Patent Application Publication No. 07-131350 is assumed as a period of a predetermined length in which a plurality of digital signals is obtained.

Based on this assumption, consideration is given to the case where the technique disclosed in Japanese Unexamined Patent Application Publication No. 07-131350 is applied to digital control of a power supply. Note that the 8-bit A/D converter illustrated in Japanese Unexamined Patent Application Publication No. 07-131350 is used as an A/D converter.

In this case, for example, in the case where the output voltage of the power supply is amplified and input to the A/D converter, the control can be performed in the manner as described below. That is, when the maximum value of a plurality of digital codes in the period of the predetermined length obtained by the A/D converter is smaller than "254" and the minimum value is larger than "1", the amplification factor of the amplifier is increased. When the maximum value is equal to "255" or when the minimum value is equal to "0", the amplification factor of the amplifier is decreased. In the other cases, the amplification factor of the amplifier is maintained at a current value.

This control enables the signal (signal obtained by amplifying the output voltage) to be input into the A/D converter to constantly match the A/D conversion range of the A/D converter. In other words, in each predetermined period, the maximum value and the minimum value of the signal to be input into the A/D converter respectively match the upper limit and the lower limit of the A/D conversion range of the A/D converter.

In this technique, however, there is a possibility that the output voltage of the digital power supply becomes unstable. One of the reasons for this is that when the predetermined period is short, the amplification factor changes frequently and the bit accuracy of the A/D converter also changes frequently.

Another reason is a decrease in noise resistance. This will be described with reference to FIG. 27.

In FIG. 27, the vertical axis represents voltage and the horizontal axis represents time. A curve illustrated in FIG. 27 indicates an exemplary mode in which the output voltage of the digital control power supply changes from a rising period to a stable period. This output voltage is smoothed. Each fine vertical line indicates a sampling timing of the A/D converter, and a sampling interval is represented by T. At time 0, the digital control power supply is powered on. A period between timing 0 and timing t1 is a rising period of the output voltage of the digital control power supply. A period after timing t1 is a stable period of the digital control power supply. Assume that in the stable period, the output voltage varies within a range between VA1 and VA2. A target voltage VAR that is a target output voltage falls within this range.

As shown in FIG. 27, each of noise D1, noise D2, noise D3, and noise D4 is noise that occurs instantaneously at a specific sampling timing. At the subsequent sampling timing, the output voltage is restored to the voltage at which no noise occurs.

According to the technique disclosed in Japanese Unexamined Patent Application Publication No. 07-131350, the amplification factor is controlled based on the maximum value and the minimum value of digital codes within a period of a predetermined length. When noise occurs instantaneously in the period, the digital code corresponding to the noise voltage indicates the maximum value or the minimum value in the period. Accordingly, the amplification factor in the subsequent period is adjusted based on the noise voltage. In this technique, however, it is difficult to accurately control the amplification factor as well as the output voltage. This results in an unstable output voltage.

One aspect is a control device that performs digital control of an output of a power supply. The control device includes: a mode control unit that selects one of a plurality of mode signals respectively corresponding to a plurality of different amplification factors; an amplifier that obtains an amplified output by amplifying the output of the power supply with an amplification factor corresponding to the mode signal selected by the mode control unit; an A/D converter that performs an A/D conversion on the amplified output to obtain a first digital value; and an output control unit that converts the first digital value into a second digital value representing the output of the power supply as a predetermined bit accuracy, obtains a difference between the second digital value and a target value, and controls the output of the power supply according to the difference, the target value being a digital value for a target output of the power supply and represented as the predetermined bit accuracy.

When the difference is set as an index value, the mode control unit selects the mode signal based on the index value and a difference absolute value range set to each of the plurality of mode signals. The difference absolute value range is a range of an absolute value of the difference set to each of the plurality of mode signals. As the amplification factor corresponding to the mode signal decreases, the absolute value of the difference included in the difference absolute value range set to the mode signal increases.

The mode control unit measures a first frequency indicating the number of occurrences of the absolute value of the index value being equal to or less than a lower limit of the difference absolute value range set to a current mode signal, and a second frequency indicating the number of occurrences of the absolute value of the index value exceeding an upper limit of the difference absolute value range set to the current mode signal. The mode control unit maintains the current mode signal when the first frequency is less than a first threshold and the second frequency is less than a second threshold. The mode control unit selects the mode signal corresponding to an amplification factor which is larger by 1 than the amplification factor corresponding to the current mode signal, when the first frequency is equal to or more than the first threshold. Further, the mode control unit selects the mode signal corresponding to an amplification factor which is smaller by 1 than the amplification factor corresponding to the current mode signal, when the second frequency is equal to or more than the second threshold.

Note that the mode control unit may use one of the first digital value and the second digital value as an index value, in place of the difference. In this case, the mode control unit measures the first frequency and the second frequency and selects the mode signal based on one of a range of the first digital value and a range of the second digital value, the range of the first digital value and the range of the second digital value being set to each of the plurality of mode signals and corresponding to the difference absolute value range.

Note that the term "frequency" refers to the number of target index values included in a plurality of consecutive index values, for example. When the difference is used as an index value, for example, the first frequency indicates the number of index values which are included in the plurality of index values and which have an absolute value equal to or less than the difference absolute value range set to the current mode signal. The second frequency indicates the number of index values which are included in the plurality of index values and which have an absolute value exceeding an upper limit of the difference absolute value range set to the current mode signal.

The sampling timing of the A/D converter, the first digital value output from the A/D converter, the second digital value output from the output control unit, and the difference are set in one-to-one correspondence. Accordingly, the phrase "the number of target index values included in a plurality of consecutive index values" described above has the same meaning as "the number of occurrences of target index values in a period of a predetermined length corresponding to a predetermined number of consecutive sampling timings".

Note that a digital control power supply including the control device according to the above-mentioned aspect is effective. Furthermore, the control device according to the above-mentioned aspect can be replaced and represented by a method, a system, or the like, which is also effective.

According to the technique of the aspect, it is possible to improve the noise resistance of the digital control power supply and to prevent the output voltage from being unstable.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
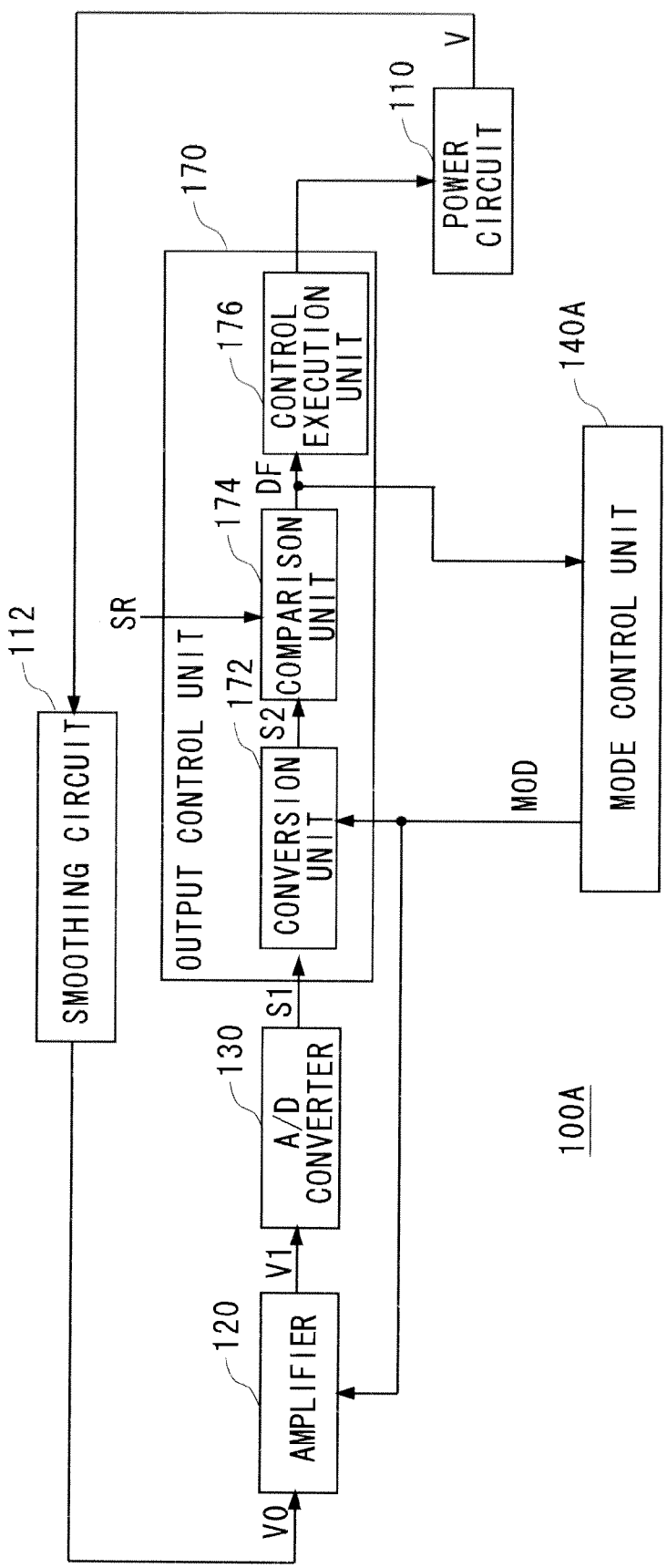
FIG. 1 is a diagram showing a digital control power supply for explaining the principle of the aspect (first example)

Hereinafter, embodiments will be described with reference to the drawings. The following description and the drawings are omitted and simplified as appropriate for clarity of the explanation. Elements illustrated in the drawings as functional blocks that perform various processes can be implemented in a hardware manner by a CPU, a memory, or other circuits, or can be implemented in a software manner by a program loaded into a memory, for example. Accordingly, as understood by those skilled in the art, these functional blocks can be implemented in various forms using only hardware or software or a combination thereof, and the present invention is not limited to any of these examples. Note that in the drawings, the same elements are denoted by the same reference numerals, and a repeated explanation is omitted as appropriate.

The program described above can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (such as magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Prior to description of specific embodiments, the principle of the technique according to the aspect is first described with reference to a digital control power supply 100A shown in FIG. 1.

The digital control power supply 100A shown in FIG. 1 includes a power circuit 110, a smoothing circuit 112, an amplifier 120, an A/D converter 130, a mode control unit 140A, and an output control unit 170.

The power circuit 110 outputs a voltage V. The smoothing circuit 112 smoothes the voltage V to obtain a smoothed voltage (hereinafter referred to as "smoothed voltage V0"). This smoothed voltage V0 is supplied to a load device (not shown). The smoothed voltage V0 corresponds to the output voltage of the digital control power supply 100A.

The digital control power supply 100A controls the output voltage of the digital control power supply 100A, that is, the smoothed voltage V0, through the control of the voltage V, and constitutes a control device.

The amplifier 120 is controlled by the mode control unit 140A. The amplifier 120 performs amplification processing on the smoothed voltage V0 so as to match the A/D conversion range of the A/D converter 130, thereby obtaining a voltage V1. This voltage V1 is hereinafter also referred to as "amplifier voltage".

Figure 2:
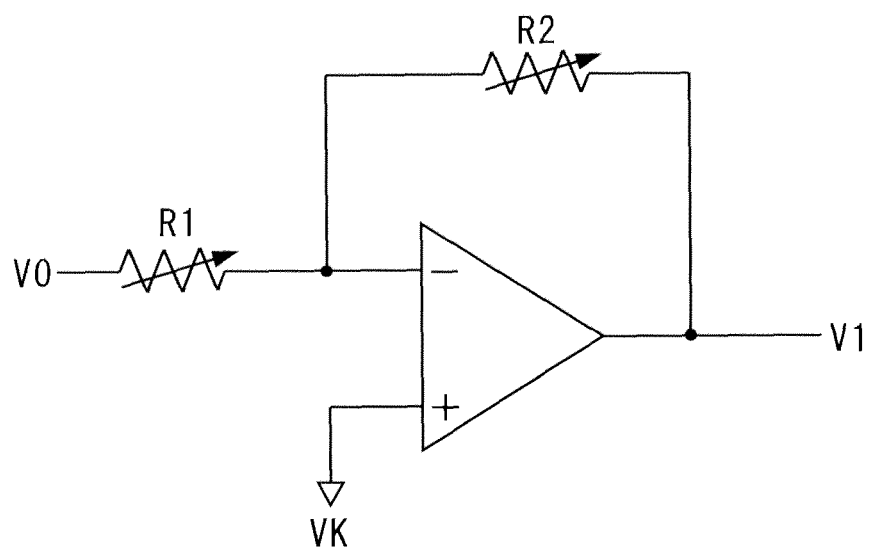
FIG. 2 is a graph showing an example of an amplifier in the digital control power supply shown in FIG. 1.

The amplifier 120 is an inverting amplifier, for example. An example of the amplifier 120 will be described with reference to FIG. 2. The amplifier 120 shown in FIG. 2 includes a resistor R1 and a resistor R2, and performs amplification processing shown in the following expression (1).

$$V1 = -W \times V0 + P \times VK \quad (1)$$
$$= -(R2/R1) \times V0 + (1 + R2/R1) \times VK$$

In the expression (1), W represents an amplification factor and VK represents a reference voltage. As is obvious from the expression (1), a parameter P corresponds to "(1+W)" and thus indicates a value that is determined depending on the amplification factor W.

The mode control unit 140A selects one of a plurality of different mode signals MOD and supplies the selected mode signal MOD to the amplifier 120. The mode signals MOD will be described in detail later. The amplification factor W and the reference voltage VK are set to each of the plurality of mode signals MOD.

The output control unit 170 includes a conversion unit 172, a comparison unit 174, and a control execution unit 176. The conversion unit 172 converts a first digital value S1 into a second digital value S2 based on the mode signal MOD output from the mode control unit 140A. The comparison unit 174 compares the second digital value S2 with a preliminarily set target value SR, and obtains a difference DF as a comparison result. The control execution unit 176 controls the voltage V such that the absolute value of the difference DF decreases, based on the difference DF from the comparison unit 174.

The target value SR is a digital value representing a target output voltage (hereinafter referred to as "target voltage VAR") of the digital control power supply 100A as a predetermined bit accuracy. The term "bit accuracy" refers to a range of an analog value represented by one bit. For example, when the smoothed voltage V0 ranges from 0 V to 5 V and the smoothed voltage V0 is represented by six bits, the bit accuracy is "5/63 (V/bits)".

To compare the first digital value S1 obtained by the A/D converter 130 with the target value SR, it is necessary to convert the first digital value S1 into the digital value representing the smoothed voltage V0 as the bit accuracy of the target voltage VAR, i.e., the second digital value S2.

Figure 3:
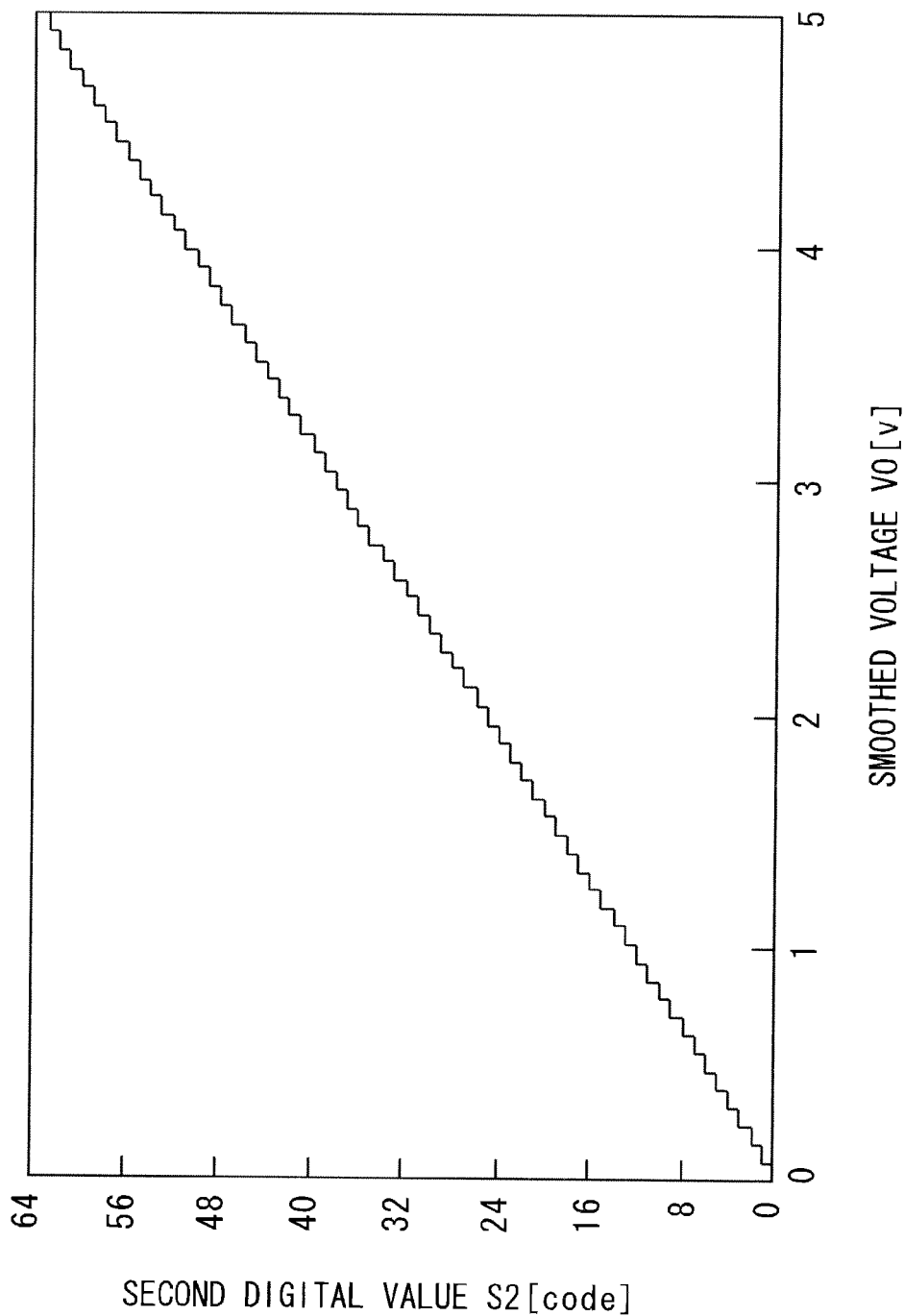
FIG. 3 is a graph showing an example of a relationship between a smoothed voltage and a second digital value.

FIG. 3 shows the relationship between the smoothed voltage V0 and the second digital value S2 when the smoothed voltage V0 ranges from 0 V to 5 V and the bit accuracy of the target voltage VAR is "5/63 (V/bits)".

The conversion unit 172 implements conversion as shown in FIG. 3 on the first digital value S1, and converts the first digital value S1 into the second digital value S2 according to the following expression (2).

$$S2 = Y \times S1 + OFS \quad (2)$$

where OFS: offset

In the expression (2), coefficients Y and OFS are determined depending on the amplification factor W and the reference voltage VK which are indicated by the mode signal MOD.

With the difference DF in the current sequence as an index value, the mode control unit 140A determines the mode signal MOD indicative of the reference voltage VK and the amplification factor of the amplifier 120 in the subsequent sequence based on the difference DF, and outputs the mode signal MOD to the amplifier 120 and the output control unit 170.

The mode control unit 140A selects one of the plurality of mode signals MOD and outputs the selected mode signal MOD to the amplifier 120 and the output control unit 170.

Each mode signal MOD indicates the reference voltage VK and the amplification factor W.

A range of the absolute value of the difference DF (hereinafter referred to as "difference absolute value range") is set to each of the plurality of mode signals MOD. The mode signal MOD corresponding to a larger amplification factor W indicates a smaller absolute value of the difference included in the difference absolute value range set to the mode signal MOD.

In the case of selecting the mode signal MOD, the mode control unit 140A measures a first frequency and a second frequency.

The term "first frequency" refers to the number of occurrences of the absolute value of the difference DF being equal to or less than a lower limit of the difference absolute value range set to the current mode signal MOD. The term "second frequency" refers to the number of occurrences of the absolute value of the difference DF exceeding an upper limit of the difference absolute value range set to the current mode signal MOD.

The mode control unit 140A maintains the current mode signal MOD when the first frequency is less than a threshold (first threshold) which is set for the first frequency and when the second frequency is less than a threshold (second threshold) which is set for the second frequency.

On the other hand, when the first frequency is equal to or more than the first threshold, the mode control unit 140A selects the mode signal MOD corresponding to an amplification factor which is larger by 1 than the amplification factor corresponding to the current mode signal MOD, as the mode signal MOD in the subsequent sequence.

When the second frequency is equal to or more than the second threshold, the mode control unit 140A selects the mode signal MOD corresponding to an amplification factor which is smaller by 1 than the amplification factor corresponding to the current mode signal MOD.

The digital control power supply 100A will now be described in more detail assuming that there are two mode signals MOD (a first mode signal and a second mode signal), for example. The mode of the digital control power supply 100A using the first mode signal MOD is referred to as a first mode, and the mode of the digital control power supply 100A using the second mode signal MOD is referred to as a second mode. Assume that the number of bits of the A/D converter 130 is three bits and the A/D conversion range thereof is 0 to 2 V. Also assume that the first threshold and the second threshold are set in a similar manner and are "three out of five", for example.

Figure 4:
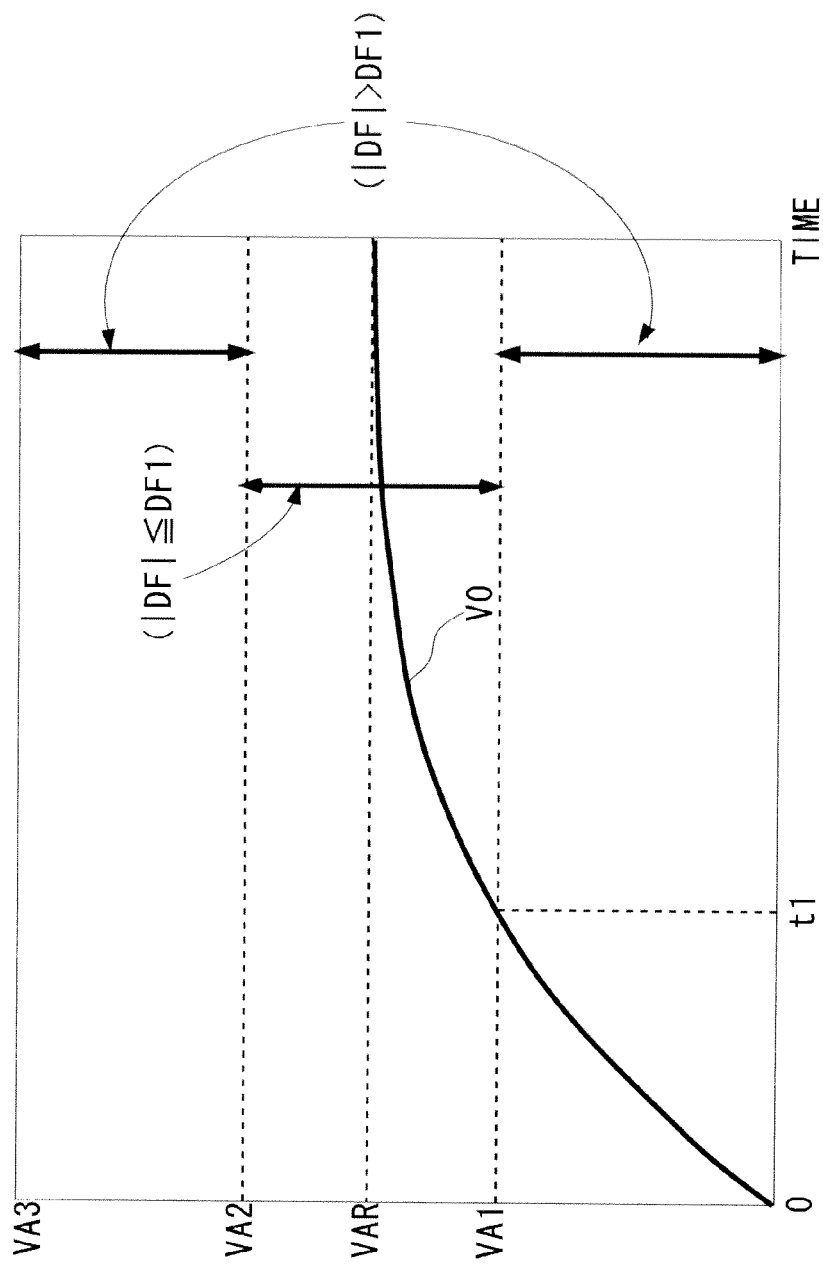
FIG. 4 is a graph for explaining a relationship between a smoothed voltage and a difference.

FIG. 4 illustrates the relationship between the smoothed voltage V0 and an absolute value |DF| of the difference DF. In FIG. 4, the vertical axis represents the smoothed voltage V0 and the horizontal axis represents time. The digital control power supply 100A is powered on at time 0, and shifts to a stable period (after t1) through a rising period (0 to t1). The smoothed voltage V0 in the stable period has a variation range of VA1 to VA2, and the target voltage VAR is an intermediate value between VA1 and VA2. The maximum smoothed voltage V0 that can be output from the digital control power supply 100A is VA3. These parameters can be known at the design stage of the digital control power supply 100A.

Assume that when the smoothed voltage V0 is VA1 or VA2, the absolute value of the difference DF is equal to or less than DF1. Accordingly, when the smoothed voltage V0 is equal to or more than VA1 and equal to or less than VA2, the absolute value of the difference DF is equal to or less than DF1. On the other hand, when the smoothed voltage V0 is smaller than VA1 and when the smoothed voltage V0 is larger than VA2, the absolute value of the difference DF is larger than DF1.

Figure 5:
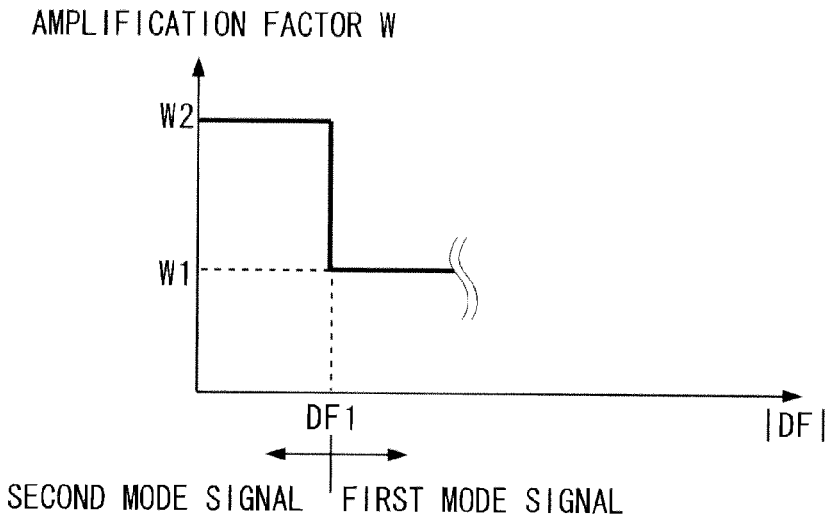
FIG. 5 is a graph for explaining a relationship between a difference absolute value range and each mode signal.

FIG. 5 illustrates the relationship between the difference absolute value range and the mode signals MOD.

The difference absolute value range set to the first mode signal MOD out of the two mode signals MOD is "larger than DF1", and the difference absolute value range set to the second mode signal MOD is "equal to or less than DF1". An amplification factor W1 corresponding to the first mode signal MOD is smaller than an amplification factor W2 corresponding to the second mode signal MOD.

Figure 6:
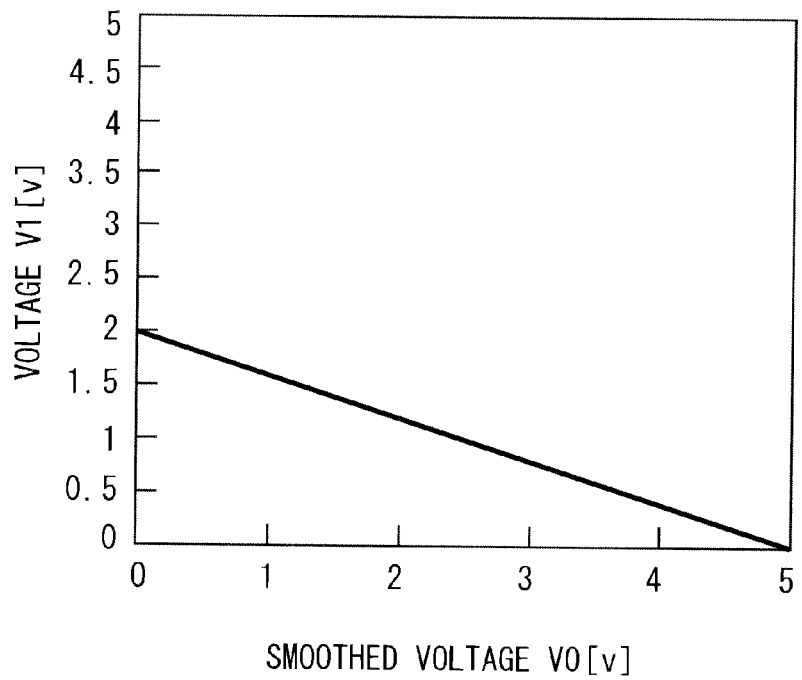
FIG. 6 is a graph showing input/output characteristics of the amplifier in a first mode.

The first mode signal MOD indicates the amplification factor W and the reference voltage VK of the amplifier 120 for converting the smoothed voltage V0, which can fall within the range of 0 V to VA3 (5 V), into the A/D conversion range (0 V to 2 V) of the A/D converter 130. FIG. 6 shows input/output characteristics of the amplifier 120 in this case.

To realize the input/output characteristics shown in FIG. 6, the amplification factor W (R2/R1) and the reference voltage VK, which are indicated by the first mode signal MOD, represent "2/5" and "10/7" V, respectively.

Figure 7:
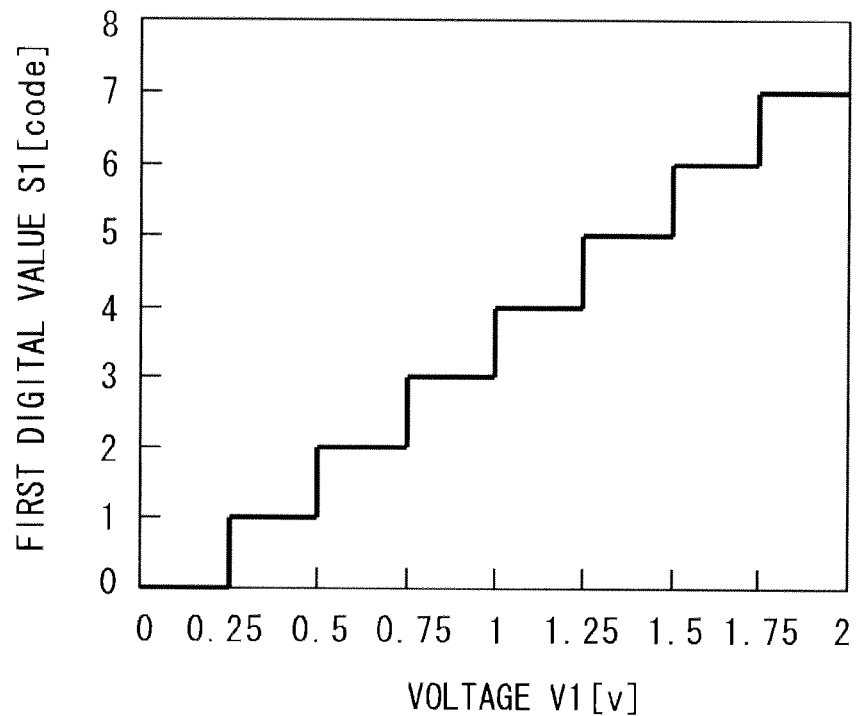
FIG. 7 is a graph showing an example of a relationship between a first digital value and an amplified voltage.

FIG. 7 shows input/output characteristics of the A/D converter 130 in this case.

As is obvious from FIG. 7, in the first mode, the bit accuracy of the A/D converter 130 with respect to the input of the A/D converter 130 is "0.25 V/code".

Figure 8:
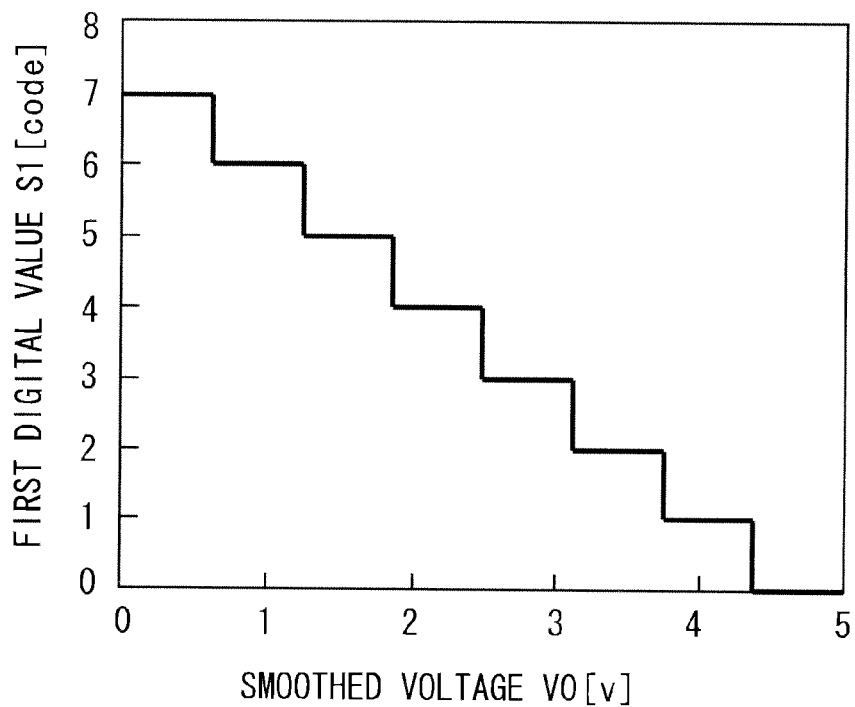
FIG. 8 is a graph showing an example of a relationship between the first digital value and the smoothed voltage in the first mode.

FIG. 8 is a graph showing the relationship between the first digital value and the smoothed voltage V0 in the first mode, which is obtained from FIGS. 6 and 7. As is obvious from FIG. 8, in the first mode, the bit accuracy of the A/D converter 130 with respect to the smoothed voltage V0 is "0.625 V/code".

Figure 9:
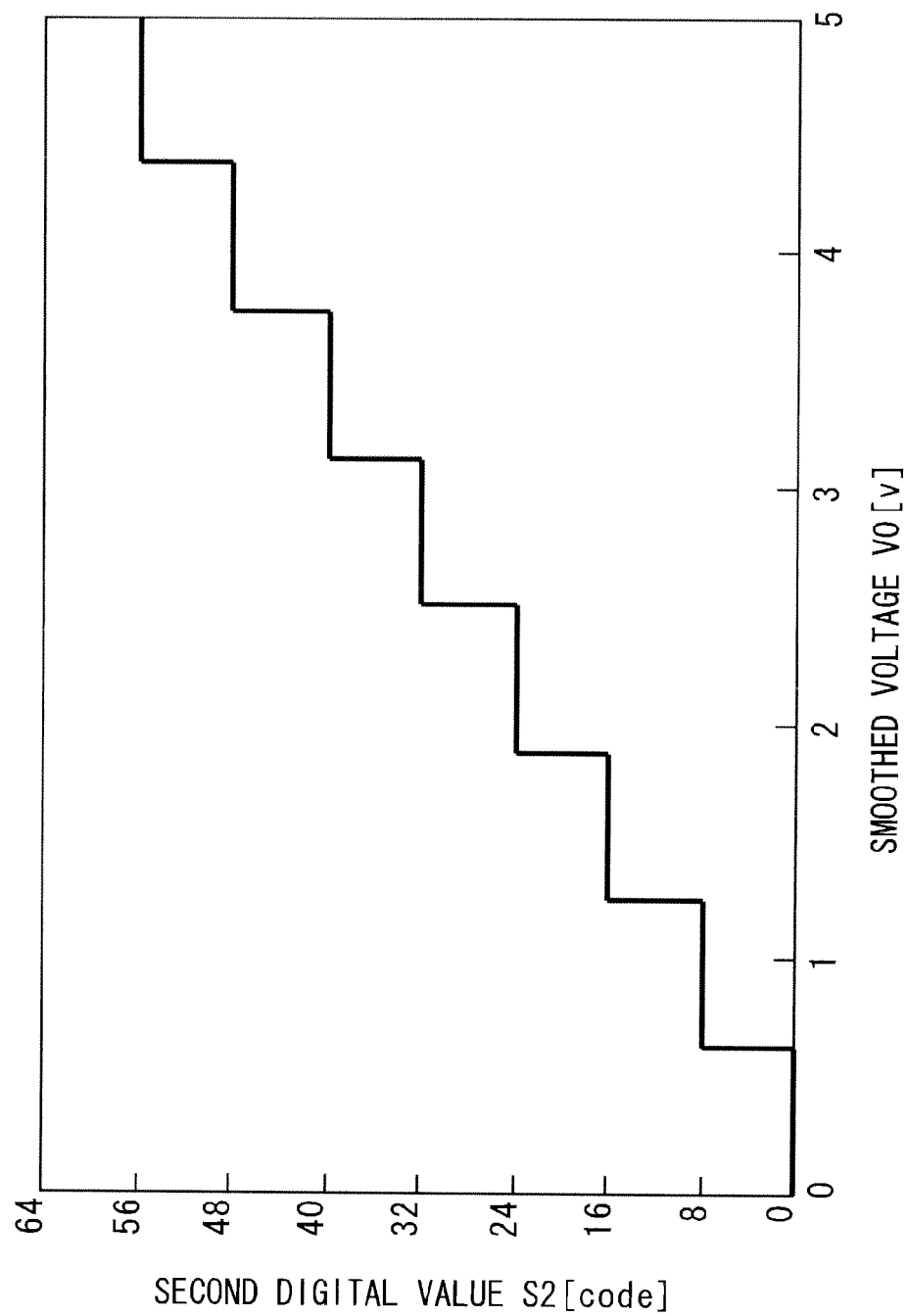
FIG. 9 is a graph showing an example of a relationship between the second digital value and the smoothed voltage in the first mode.

The relationship between the second digital value S2 and the smoothed voltage V0 in the first mode as shown in FIG. 9 can be obtained from FIGS. 6 to 8.

Figure 10:
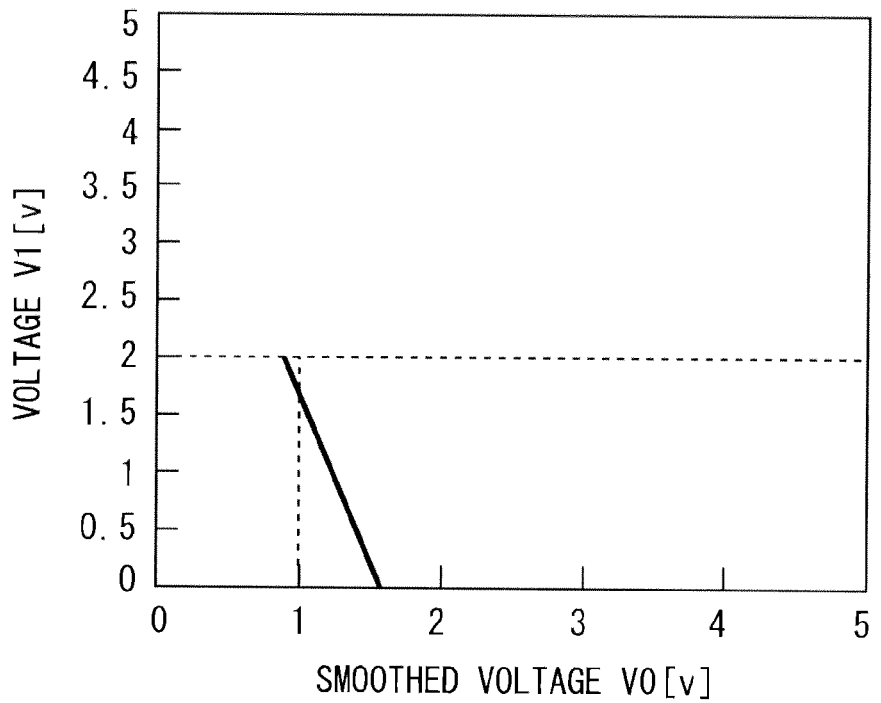
FIG. 10 is a graph showing an example of input/output characteristics of the amplifier in a second mode.

The second mode signal MOD indicates the amplification factor W and the reference voltage VK of the amplifier 120 for converting the smoothed voltage V0, which can fall within the range of VA1 to VA2, into the A/D conversion range (0 V to 2 V) of the A/D converter 130. FIG. 10 shows an example of the input/output characteristics of the amplifier 120 in the second mode when the target voltage VAR of the digital control power supply 100A is "1.25 V". Assume that the range of VA1 to VA2 corresponds to the range (0.625 V) of one code of the first digital value S1 in the first mode. Specifically, VA1 and VA2 are 0.9375 V and 1.5625 V, respectively.

To realize the input/output characteristics shown in FIG. 10, the amplification factor W (R2/R1) and the reference voltage VK, which are indicated by the second mode signal MOD, are "16/5" and "25/21" V, respectively.

As shown in FIG. 7, the input/output characteristics of the A/D converter 130 in this case are the same as those in the first mode. In other words, also in the second mode, the bit accuracy of the A/D converter 130 with respect to the input of the A/D converter 130 is "0.25 V/code".

Figure 11:
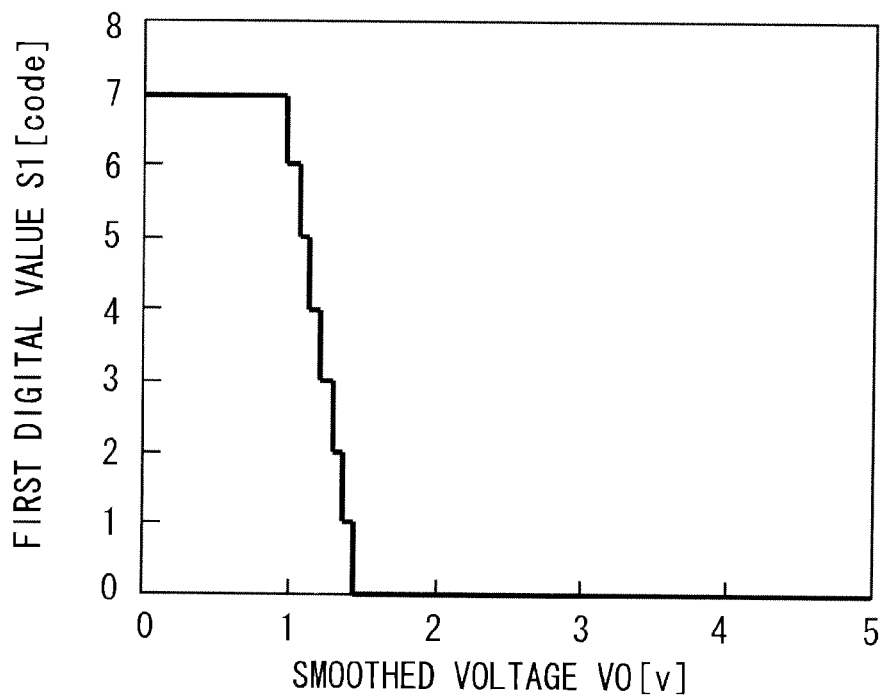
FIG. 11 is a graph showing an example of a relationship between the first digital value and the smoothed voltage in the second mode.

FIG. 11 is a graph showing the relationship between the first digital value S1 and the smoothed voltage V0 in the second mode, which is obtained from FIGS. 10 and 7. As is obvious from FIG. 11, in the second mode, the bit accuracy of the A/D converter 130 with respect to the smoothed voltage V0 is "78.125 mV/code".

Figure 12:
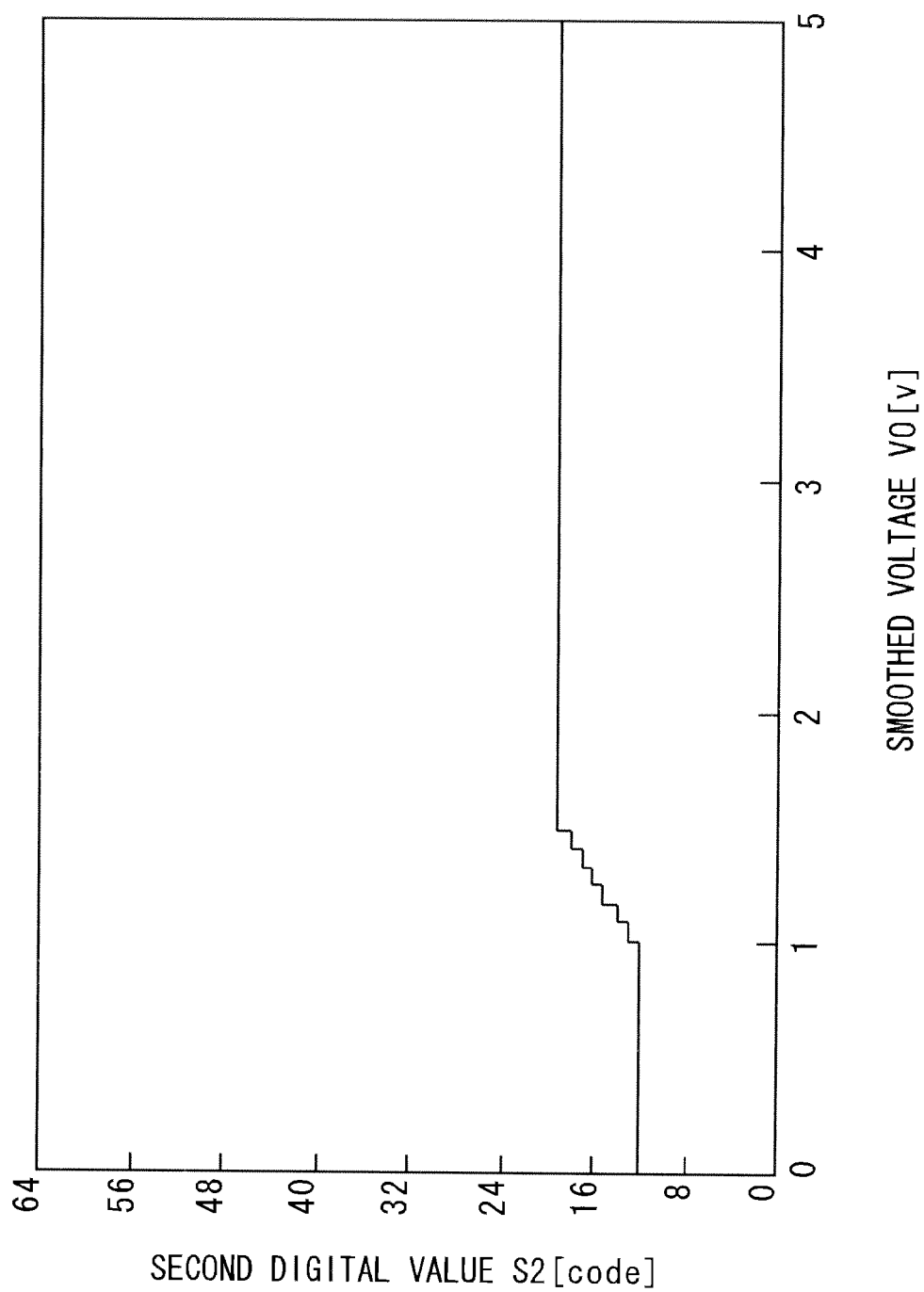
FIG. 12 is a graph showing an example of a relationship between the second digital value and the smoothed voltage in the second mode.

FIG. 12 shows the relationship between the second digital value S2 and the smoothed voltage V0 in the second mode.

Figure 13:
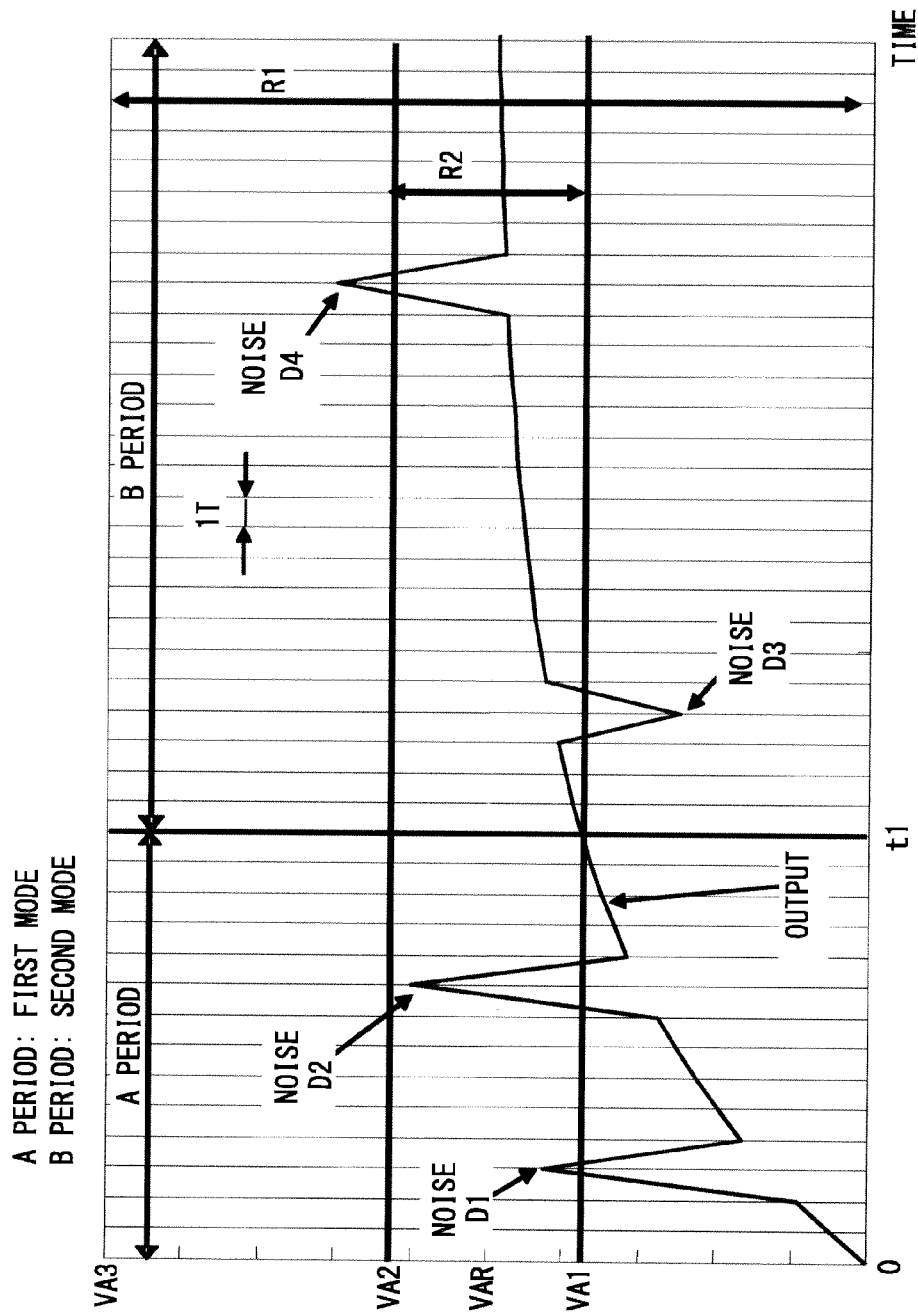
FIG. 13 is a graph for explaining an example of processing performed by the digital control power supply shown in FIG. 1.
Figure 27:
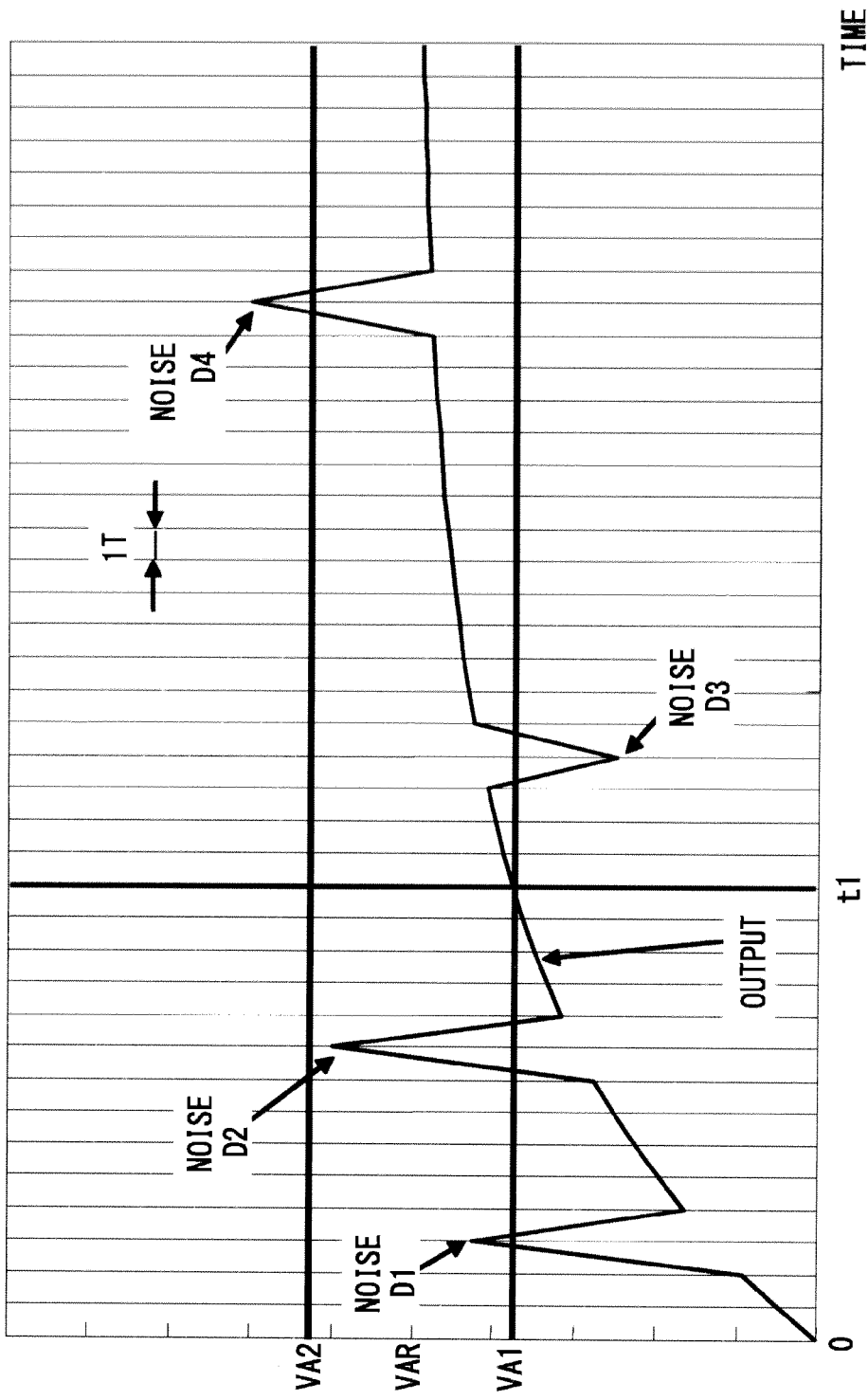
FIG. 27 is a graph for explaining a problem caused when a technique disclosed in Japanese Unexamined Patent Application Publication No. 07-131350 is applied to digital control of a power supply.

Referring to FIG. 13, an example of processing performed by the digital control power supply 100A will be described. Like in FIG. 27, the vertical axis and the horizontal axis in FIG. 13 represent the smoothed voltage V0 and time, respectively. Each noise is similar to that shown in FIG. 27.

At power-on of the digital control power supply 100A, the mode control unit 140A outputs the first mode signal MOD. Accordingly, the amplifier 120 amplifies the smoothed voltage V0 with the input/output characteristics shown in FIG. 6 to thereby obtain the amplified voltage V1. As is obvious from the above description, at this time, the range of the amplified voltage V1 obtained by amplifying the smoothed voltage V0 within the range of 0 to VA3 matches the A/D conversion range of the A/D converter 130.

The output control unit 170 converts the first digital value S1, which is obtained such that the A/D converter 130 performs an A/D conversion on the amplified voltage V1, into the second digital value S2, and compares the second digital value S2 with the target value SR, thereby obtaining the difference DF. Then, according to the comparison result, the output control unit 170 controls the voltage V in the direction in which the absolute value of the difference DF decreases.

In parallel, the mode control unit 140A measures the first frequency. Specifically, in the five consecutive differences DF, the number M of differences DF equal to or less than the difference DF1, which is the lower limit of the difference absolute value range, is measured. When the number M is less than 3, the mode signal MOD is maintained at the first mode signal MOD. When the number M is equal to or more than 3, the mode signal MOD is changed to the second mode signal MOD.

Since the difference absolute value range set to the first mode signal MOD is "larger than DF1" and there is no upper limit, the mode control unit 140A does not measure the second frequency in the first mode.

When the noise D1 occurs in the rising period, the smoothed voltage V0 at the sampling timing exceeds the smoothed voltage VA1. Accordingly, the absolute value of the difference DF is also smaller than DF1. In this case, the mode control unit 140A counts "1" as the number M.

However, at the subsequent sampling timing, the smoothed voltage V0 is smaller than the smoothed voltage VA1 and the absolute value of the difference DF is larger than DF1. Accordingly, the mode control unit 140A resets the number M to "0". As a result, the mode signal MOD is maintained at the first mode signal MOD, and the shift from the first mode to the second mode does not occur.

The same holds true for the nose D2 that occurs in the rising period.

The smoothed voltage V0 continuously rises and reaches the smoothed voltage VA1 at timing t1. The mode control unit 140A counts "1" as the number M at timing t1, and thereafter counts up the count value at each of consecutive sampling timings. Accordingly, when the number M is "3", the mode signal MOD is changed from the first mode signal MOD to the second mode signal MOD.

For this reason, the amplifier 120 amplifies the smoothed voltage V0 with the input/output characteristics shown in FIG. 10. As is obvious from the above description, at this time, the range of the amplified voltage V1 obtained by amplifying the smoothed voltage V0 within the range of VA1 to VA2 matches the A/D conversion range of the A/D converter 130.

In accordance with the shift from the first mode to the second mode, the output control unit 170 changes the parameters for use in converting the first digital value S1 into the second digital value S2. The output control unit 170 performs processing similar to that in the first ode, except that the parameters are different.

In parallel, the mode control unit 140A measures the second frequency. Specifically, in the five consecutive differences DF, the number N of differences DF exceeding the difference DF1, which is the upper limit of the difference absolute value range, is measured. When the number N is less than 3, the mode signal MOD is maintained at the second mode signal MOD. When the number N is equal to or more than 3, the mode signal MOD is changed to the first mode signal MOD.

Since the difference absolute value range set to the second mode signal MOD is "equal to or less than DF1" and there is no lower limit, the mode control unit 140A does not measure the first frequency in the second mode.

When the noise D3 occurs, the smoothed voltage V0 is smaller than the voltage VA1 and the absolute value of the difference DF is larger than DF1. Accordingly, the mode control unit 140A counts "1" as the number N. However, at the subsequent sampling timing, the smoothed voltage V0 is larger than the smoothed voltage VA1 and the absolute value of the difference DF is smaller than DF1. Accordingly, the mode control unit 140A resets the number M to "0". As a result, the mode signal MOD is maintained at the second mode signal MOD, and the shift from the second mode to the first mode does not occur.

Similarly, when the noise D4 occurs, the mode control unit 140A counts "1" as the number N. However, at the subsequent sampling timing, the mode control unit 140A resets the number M to "0". Also in this case, the mode signal MOD is maintained at the second mode signal MOD, and the shift from the second mode to the first mode does not occur.

In this manner, according to the digital control power supply 100A, the mode signal MOD is not changed even when noise occurs instantaneously. Consequently, a digital control power supply with high noise resistance can be achieved.

Further, the amplification factor and the reference voltage are changed in a stepwise fashion depending on the magnitude of the voltage V in different periods (the rising period and the stable period) of the digital control power supply. This prevents the amplification factor or the bit accuracy from being frequently changed, and stabilizes the output voltage.

Immediately after power-on of the digital control power supply 100A, the control is performed in the first mode in which the amplification factor is minimum. This is advantageous in that the smoothed voltage V0 converges rapidly.

In the digital control power supply 100A, when the difference DF is set as an index value, the mode control unit 140A selects the mode signal MOD corresponding to the amplification factor that increases as the absolute value of the difference DF decreases. As this index value, the first digital value S1 or the second digital value S2 may be used in place of the difference DF.

Figure 14:
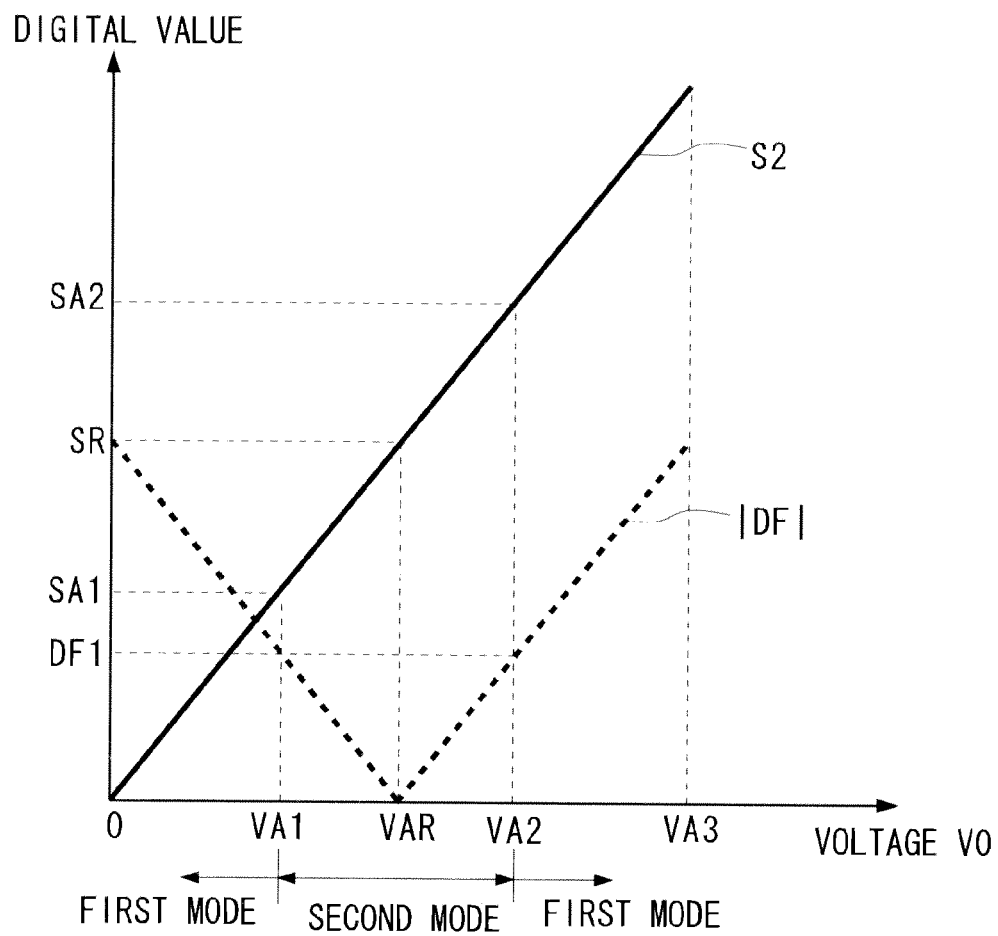
FIG. 14 is a graph for explaining a relationship between the second digital value and the difference absolute value range.

FIG. 14 is a graph showing an example of the relationship between the difference OF and the second digital value S2. In FIG. 14, the vertical axis represents a digital value and the horizontal axis represents the smoothed voltage V0. The dashed line and the solid line represent the absolute value |DF| of the difference DF and the second digital value S2, respectively.

As shown in FIG. 14, the range of the absolute value of the difference DF (difference absolute value range) has a correspondence relation with the range of the second digital value S2. The difference absolute value range which is "larger than DF1" corresponds to the range of the second digital value S2 which is "smaller than SA1" and "larger than SA2". Similarly, the difference absolute value range of "equal to or less than DF1" corresponds to the range of the second digital value S2 which is "equal to or more than SA1 and equal to or less than SA2".

Figure 15:
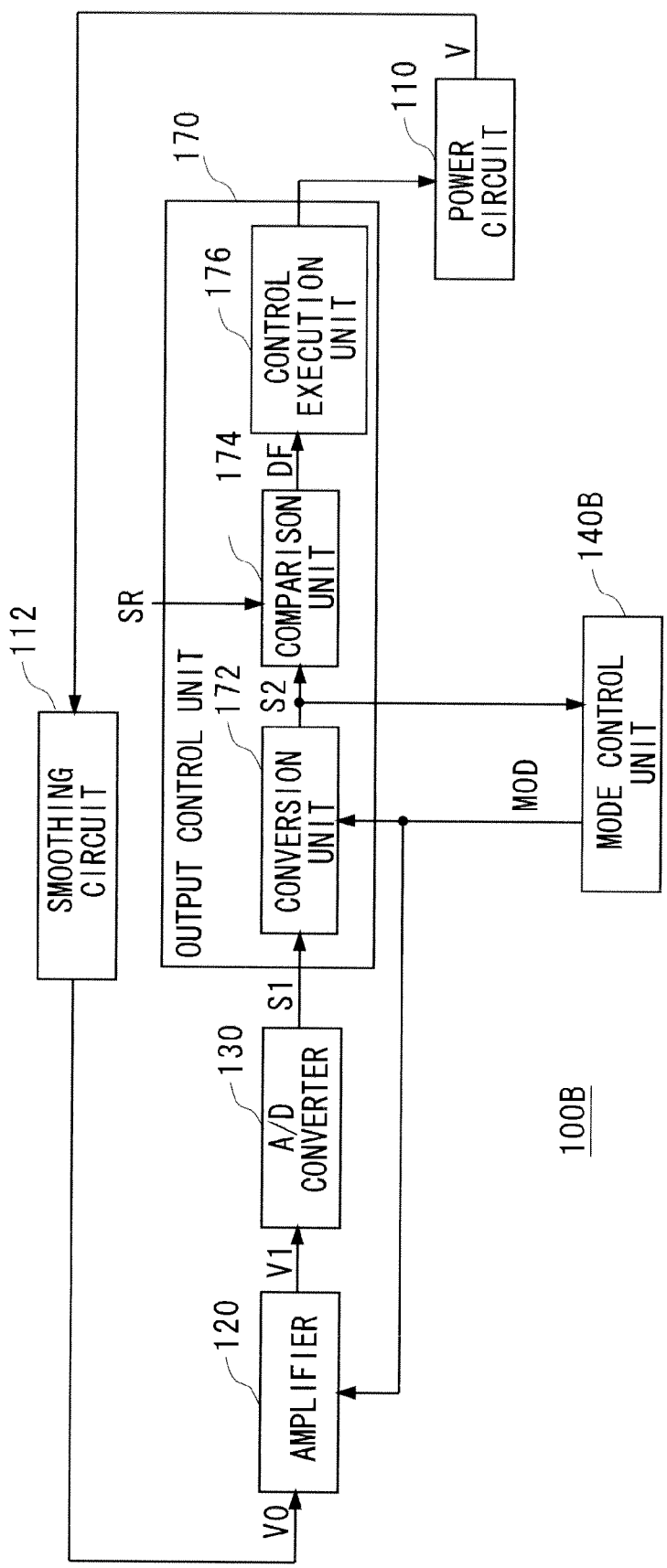
FIG. 15 is a diagram showing a digital control power supply for explaining the principle of the aspect (second example)

FIG. 15 shows a digital control power supply 100B that selects the mode signal MOD with the second digital value S2 as an index value. In the digital control power supply 100B, the other functional blocks other than a mode control unit 140B are similar to the respective functional blocks in the digital control power supply 100A.

The mode control unit 140B is similar to the mode control unit 140A in the digital control power supply 100A, except that the second digital value S2 is input in place of the difference DF and the mode signal MOD is selected using the second digital value S2 as an index value.

Specifically, at power-on of the digital control power supply 100B, the mode control unit 140B outputs the first mode signal MOD. At this time, the digital control power supply 100B is in the first mode.

In the first mode, the mode control unit 140B measures the first frequency. Specifically, in the five consecutive second digital values S2, the number M of second digital values S2 that are equal to or more than SA1 and equal to or less than SA2 as shown in FIG. 14 are measured. When the number M is less than "3", the mode signal MOD is maintained at the first mode signal MOD. When the number M is equal to or more than "3", the mode signal MOD is changed to the second mode signal MOD.

In the second mode, i.e., when the mode signal MOD is the second mode signal MOD, the mode control unit 140B measures the second frequency. Specifically, in the five consecutive second digital values S2, the number N1 of second digital values S2 smaller than SA1 and the number N2 of second digital values S2 larger than SA2 are measured. When both the number N1 and the number N2 are less than "3", the mode signal MOD is maintained at the second mode signal MOD. When one of the number N1 and the number N2 is equal to or more than "3", the mode signal MOD is changed to the first mode signal MOD.

In the digital control power supply 100B, the mode control unit 140B selects the mode signal MOD based on the second digital value S2, but actually selects the mode signal MOD based on the difference DF in the same manner as in the mode control unit 140A. Accordingly, all the advantageous effects obtained by the digital control power supply 100A can be obtained.

Further, in the second mode, in the case of measuring the second frequency corresponding to the number of differences DF having an absolute value exceeding DF1, the number N1 of second digital values S2 smaller than SA1 and the number N2 of second digital values S2 larger than SA2 are measured separately. This makes it possible to improve the noise resistance even when the smoothed voltage V0 greatly varies due to external factors or the like.

Figure 16:
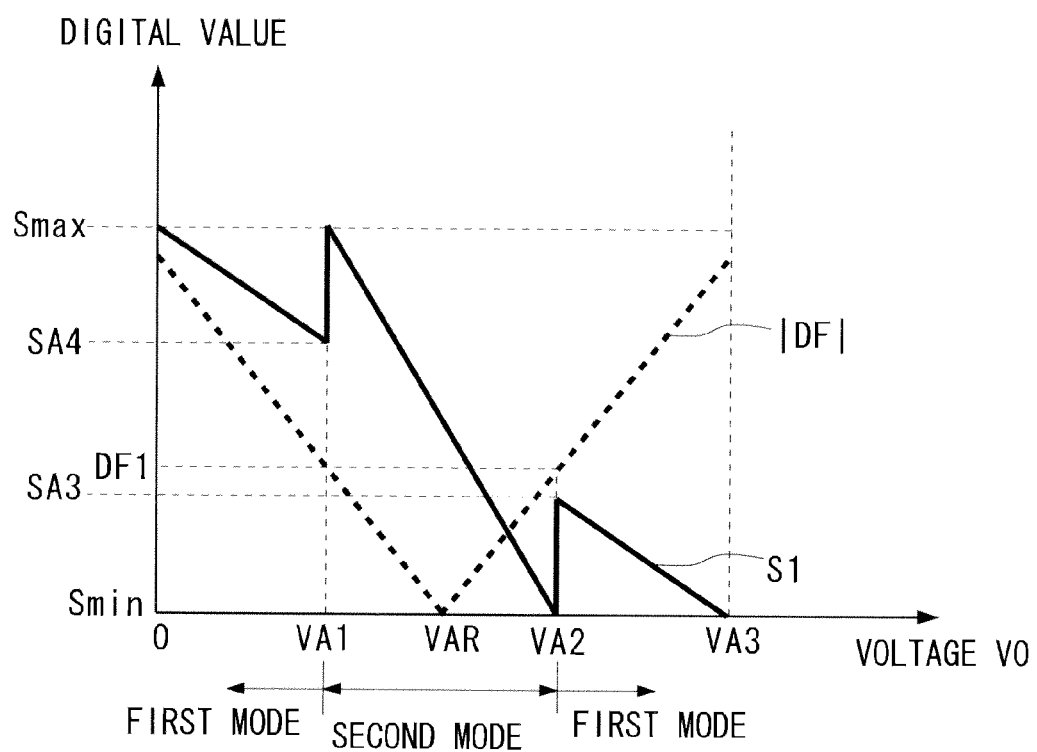
FIG. 16 is a graph for explaining a relationship between the first digital value and the difference absolute value range.

FIG. 16 is a graph showing an example of the relationship between the difference DF and the first digital value S1. In FIG. 16, the vertical axis represents a digital value and the horizontal axis represents the smoothed voltage V0. The dashed line and the solid line represent the absolute value |DF| of the difference DF and the first digital value S1, respectively. Note that Smin represents a minimum code of the A/D converter 130 and Smax represents a maximum code of the A/D converter 130.

As shown in FIG. 16, the difference absolute value range has a correspondence relationship with the range of the first digital value S1. The difference absolute value range of "larger than DF1" corresponds to the range of the first digital value S1 which is "larger than SA4" and "smaller than SA3"

in the first mode, and corresponds to the range of the first digital value S1 which is "equal to the minimum code Smin" and "equal to the maximum code Smax" in the second mode. Similarly, the difference absolute value range of "equal to or less than DF1" corresponds to the range of the first digital value of "equal to or less than SA4 and equal to or more than SA3" in the first mode, and corresponds to the range of the first digital value S1 of "larger than the minimum code Smin and smaller than the maximum code Smax" in the second mode.

Figure 17:
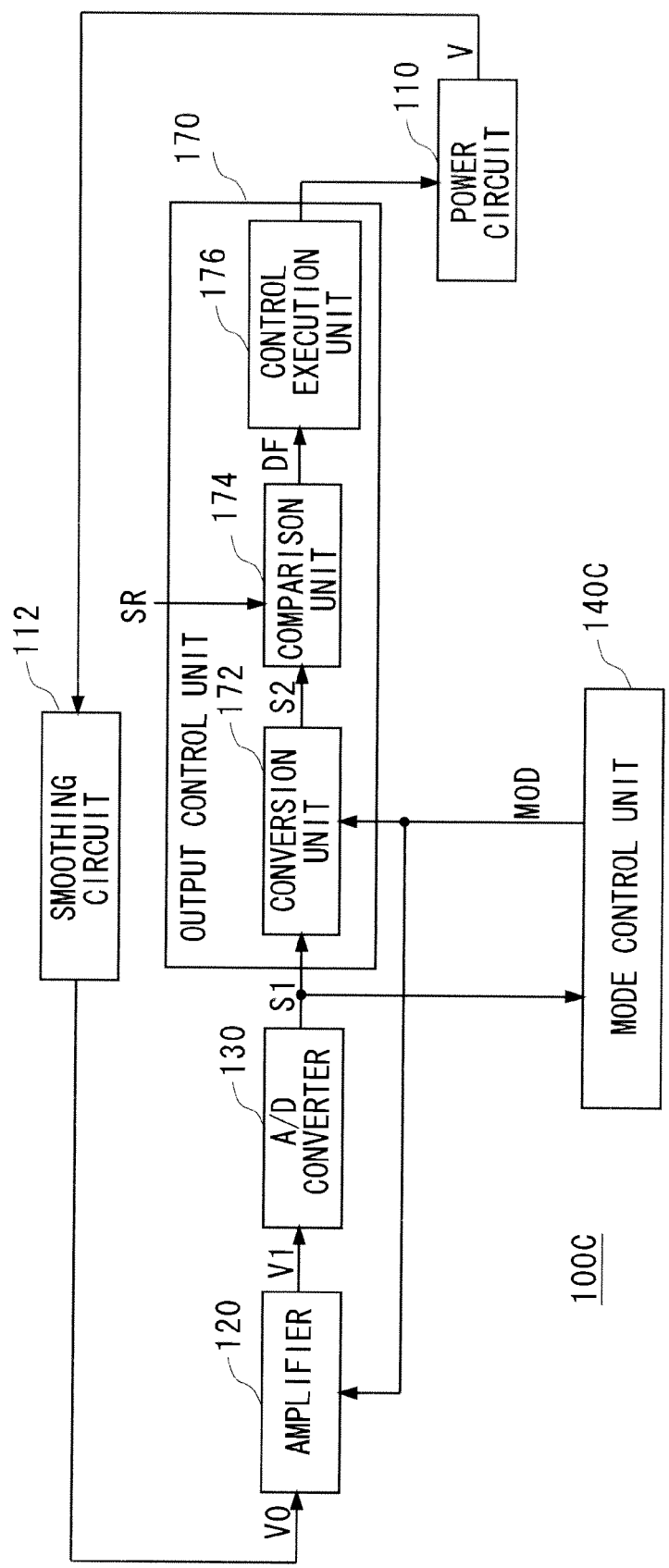
FIG. 17 is a diagram showing a digital control power supply for explaining the principle of the aspect (third example)

FIG. 17 shows a digital control power supply 100C that selects the mode signal MOD with the first digital value S1 as an index value. In the digital control power supply 100C, the other functional blocks other than a mode control unit 140C are similar to the respective functional blocks in the digital control power supply 100A.

The mode control unit 140C is similar to the mode control unit 140A in the digital control power supply 100A, except that the first digital value S1 is input in place of the difference DF and the mode signal MOD is selected using the first digital value S1 as an index value.

Specifically, at power-on of the digital control power supply 100C, the mode control unit 140C outputs the first mode signal MOD. At this time, the digital control power supply 100C is in the first mode.

In the first mode, the mode control unit 140C measures the first frequency. Specifically, in the five consecutive first digital values S1, the number M of first digital values S1 which are equal to or less than SA4 and equal to or more than SA3 as shown in FIG. 16 is measured. When the number M is less than 3, the mode signal MOD is maintained at the first mode signal MOD. When the number M is equal to or more than 3, the mode signal MOD is changed to the second mode signal MOD.

In the second mode, i.e., when the mode signal MOD is the second mode signal MOD, the mode control unit 140C measures the second frequency. Specifically, in the five consecutive first digital values S1, the number N1 of first digital values S1 reaching the minimum code Smin of the A/D converter 130 and the number N2 of first digital values S1 reaching the maximum code Smax of the A/D converter 130 are measured. When both the number N1 and the number N2 are less than 3, the mode signal MOD is maintained at the second mode signal MOD. When one of the number N1 and the number N2 is equal to or more than 3, the mode signal MOD is changed to the first mode signal MOD.

In the digital control power supply 100C, the mode control unit 140C selects the mode signal MOD based on the first digital value S1, but actually selects the mode signal based on the difference DF in the same manner as in the mode control unit 140A. Accordingly, all the advantageous effects obtained by the digital control power supply 100A can be obtained.

Further, in the second mode, in the case of measuring the second frequency corresponding to the number of differences DF having an absolute value exceeding DF1, the number N1 of first digital values S1 reaching the minimum code Smin and the number N2 of first digital values S1 reaching the maximum code Smax are measured separately. This makes it possible to improve the noise resistance even when the smoothed voltage V0 greatly varies due to external factors or the like, as in the case of using the second digital value S2 as an index value.

The digital control power supplies 100A, 100B, and 100C are based on the same principle. However, from the viewpoint of the speed at which the appropriate mode signal MOD is determined according to a change in the smoothed voltage V0, it is most preferable to use the digital control power supply 100C that selects the mode signal MOD with the first digital value S1 as an index value.

On the basis of the principle described above, specific embodiments will be described. Hereinafter, the first digital value S1 is used, for example, as an index value for selecting the mode signal MOD.

<First Embodiment>

Figure 18:
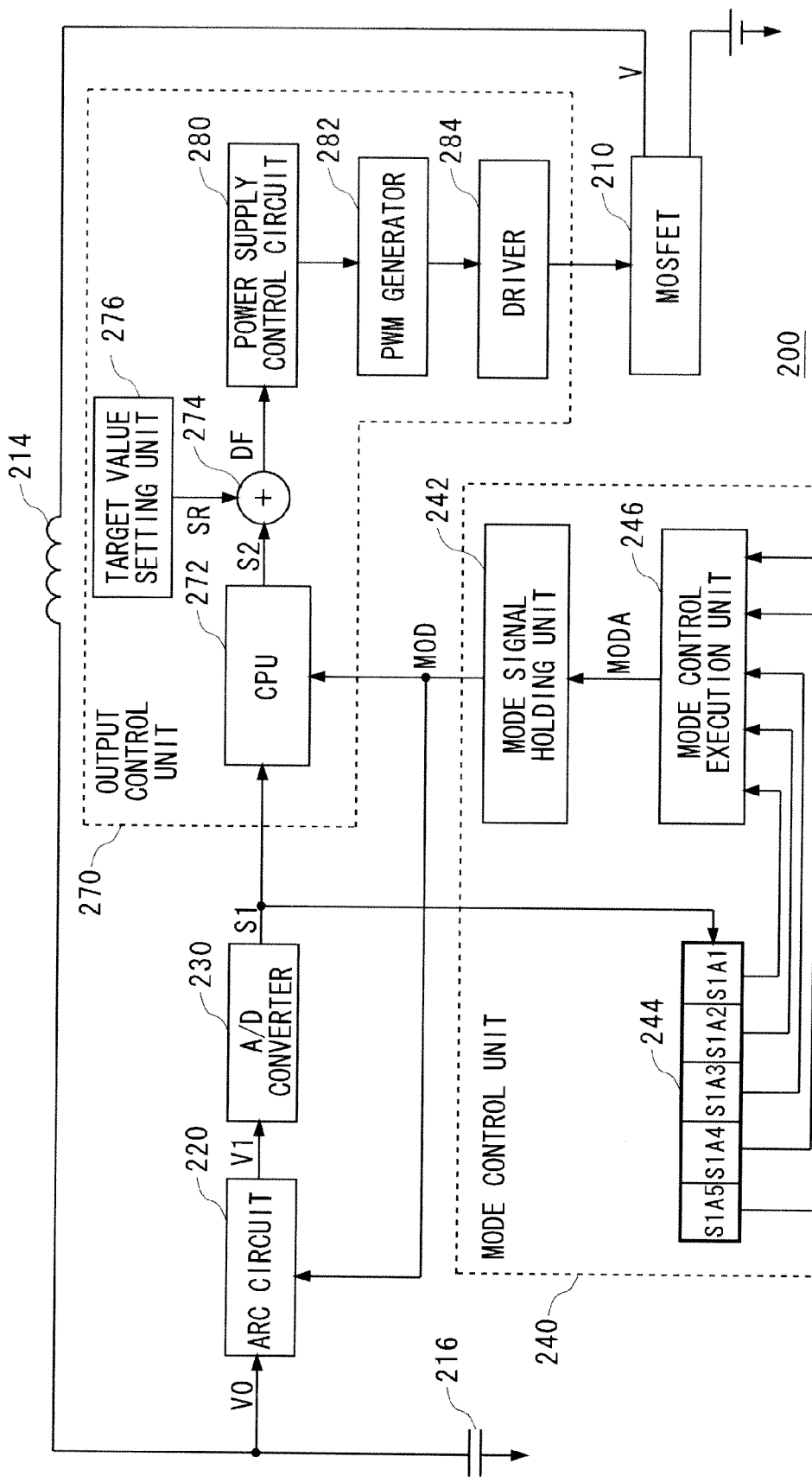
FIG. 18 is a diagram showing a digital control power supply according to a first embodiment.

FIG. 18 shows a digital control power supply 200 according to a first embodiment. The digital control power supply 200 includes a MOSFET (Metal Oxide Semiconductor Field Effect Transistor) 210, an ARC circuit 220, an A/D converter 230, a mode control unit 240, and an output control unit 270.

The MOSFET 210 is a switching element and corresponds to the power circuit 110 in the digital control power supplies 100A to 100C. The MOSFET 210 is connected to a DC power supply (not shown) and obtains the voltage V by switching.

An inductor 214 and a capacitor 216 constitute an LC filter and corresponds to the smoothing circuit 112 in the digital control power supplies 100A to 100C.

The ARC circuit 220 (ARC: Auto Range Control) corresponds to the amplifier 120 in the digital control power supplies 100A to 100C, for example, and has an inverting amplification function and a reference voltage adjustment function.

The A/D converter 230 corresponds to the A/D converter 130 in the digital control power supplies 100A to 100C, and the number of bits of the A/D converter 230 is, for example, three bits.

The mode control unit 240 corresponds to the mode control unit 140C in the digital control power supply 100C, and includes a mode signal holding unit 242, an index value holding unit 244, and a mode control execution unit 246.

The mode signal holding unit 242 receives the mode signal MOD from the mode control execution unit 246 and holds the mode signal MOD. After that, the mode signal holding unit 242 continuously outputs the held mode signal MOD to each of the ARC circuit 220 and the output control unit 270 until another mode signal MOD (which is referred to as "MODA" so as to be distinguished from the mode signal MOD which is held and output by the mode signal holding unit 242) is received from the mode control execution unit 246. The mode signal holding unit 242 is a flip-flop (FF), for example.

The index value holding unit 244 receives the first digital value S1 from the A/D converter 230, and updates and holds K (K is an integer equal to or more than 2) number of first digital values S1 that are successively input. In the other words, the index value holding unit 244 constantly holds the K number of latest first digital values S1. Assume herein that K indicates 5 and the index value holding unit 244 is a shift register, for example. The five digital values S1 held in the shift register 144 are represented by S1A1 to S1A5, respectively, which are input in this order.

The mode control execution unit 246 performs determination processing for determining one of the first mode signal MOD and the second mode signal MOD as the mode signal MOD. Specifically, when it is determined to maintain the mode signal MOD based on the latest first digital values S1 held in the shift register 244, the mode signal MODA is not output to the mode signal holding unit 242, and when it is determined to change the mode signal MOD based on the latest first digital values S1 held in the shift register 244, the determined mode signal is output to the mode signal holding unit 242 as the mode signal MODA. The first mode signal and second mode signal herein described are similar to the first mode signal and second mode signal described to explain the digital control power supplies 100A to 100C. The processing for determining the mode signal MOD by the mode control execution unit 246 is similar to the corresponding processing of the mode control unit 140C in the digital control power supply 100C.

The ARC circuit 220 amplifies the smoothed voltage V0 according to the above-mentioned expression (1) in response to the mode signal MOD, thereby obtaining the amplified voltage V1.

The output control unit 270 includes a CPU 272, an adder 274, a target value setting unit 276, a power supply control circuit 280, a PWM generator 282, and a driver 284.

The CPU 272 corresponds to the conversion unit 172 of the output control unit 170 in the digital control power supplies 100A to 100C, and converts the first digital value S1 into the second digital value S2 according to the above-mentioned expression (2).

The target value setting unit 276 supplies the target value SR corresponding to the target value VAR of the smoothed voltage V0 to the adder 274.

The adder 274 corresponds to the comparison unit 174 in the digital control power supplies 100A to 100C. The adder 274 obtains the difference DF between the second digital value S2 and the target value SR from the target value setting unit 276, and outputs the difference DF to the power supply control circuit 280.

The power supply control circuit 280, the PWM generator 282, and the driver 284 correspond to the control execution unit 176 in the digital control power supplies 100A to 100C, and perform operations similar to those of the respective functional blocks in a typical digital control power supply. The power supply control circuit 280 calculates the duty value of a PWM signal, which is generated by the PWM generator 282, through a digital operation, such as a PID control (PID: Proportional Integral Derivative), based on the difference DF, and outputs the value to the PWM generator 282. The PWM generator 282 converts the duty value from the power supply control circuit 280 into a PWM waveform, and outputs the PWM waveform to the driver 284. The driver 284 generates a signal for driving the MOSFET 210 according to the PWM waveform from the PWM generator 282, and outputs the signal to the MOSFET 210.

Figure 19:
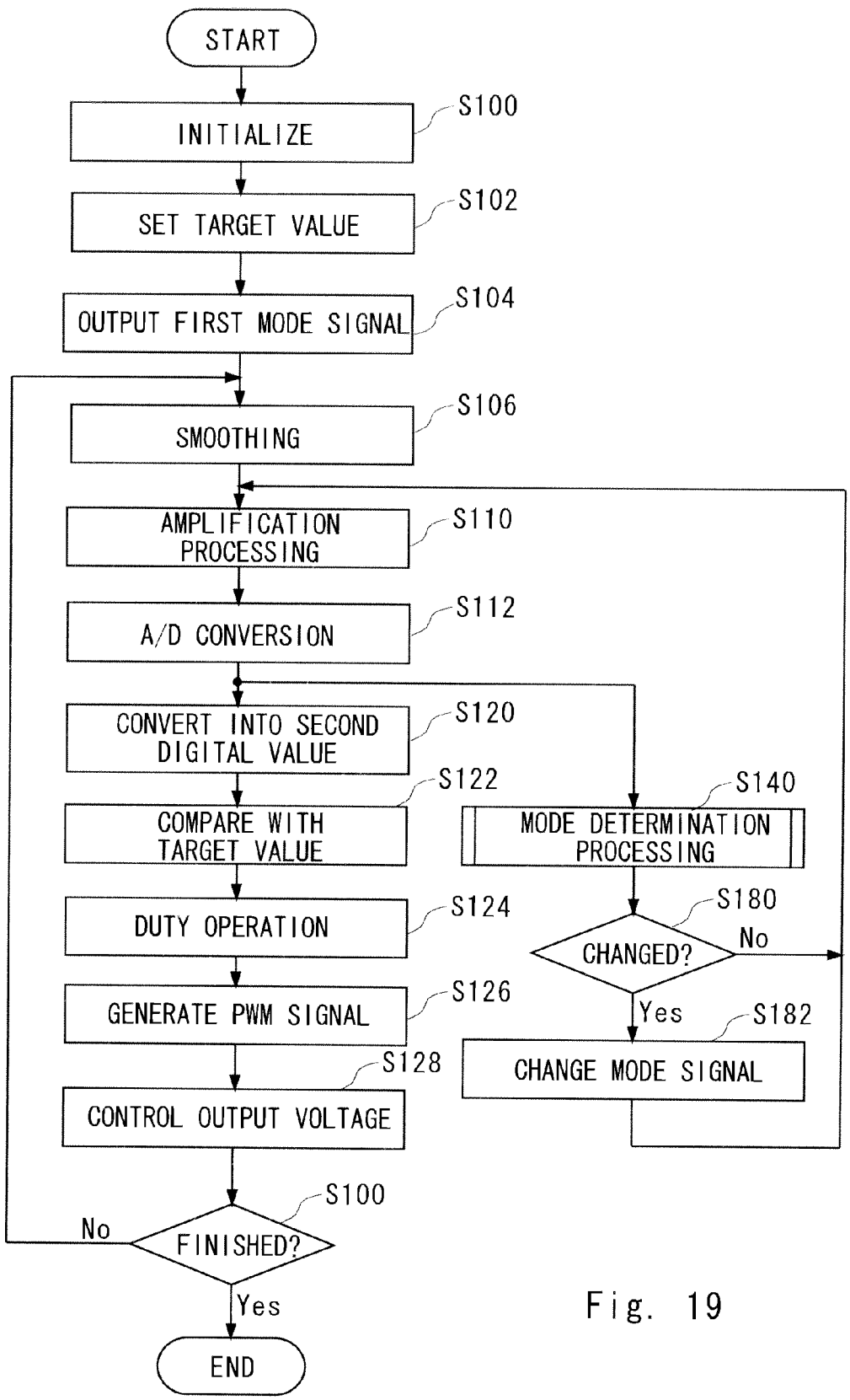
FIG. 19 is a flowchart showing processing performed by the digital control power supply shown in FIG. 18.

FIG. 19 is a flowchart showing the processing of the digital control power supply 200. At power-on, the initialization of the entire digital control power supply 200 is carried out (S100). The target value setting unit 276 sets the target value SR (S102), and the mode control unit 240 outputs the first mode signal MOD to the ARC circuit 220 and the CPU 272 (S104).

The voltage V is smoothed by the inductor 214 and the capacitor 216, and the smoothed voltage V0 is input to the ARC circuit 220 (S106).

The smoothed voltage V0 is amplified by the ARC circuit 220 according to the reference voltage VK and the amplification factor W which are indicated by the current mode signal MOD, and is input to the A/D converter 230 (S110).

The amplified voltage V1 obtained by the ARC circuit 220 is converted into the first digital value S1 by the A/D converter 230 (S112). The processing of steps S120 to S128 is carried out by the output control unit 270 and the processing of steps S140 to S182 is carried out by the mode control unit 240.

In the output control unit 270, the CPU 272 converts the first digital value S1 into the second digital value S2 (S120). The adder 274 obtains the difference DF between the second digital value S2 and the target value SR (S122). The power supply control circuit 280 calculates the duty of the PWM generator 282 based on the difference DF (S124), and the PWM generator 282 generates the PWM signal according to the duty calculated by the power supply control circuit 280 (S126). Then, the driver 284 generates the driving signal based on the PWM signal. The MOSFET 210 is controlled by the driving signal, and the voltage V is controlled (S128).

The mode control unit 240 determines whether to change the mode signal MOD from the current mode (S140). When it is determined to change the mode signal MOD, the mode signal MOD to be output to each of the ARC circuit 220 and the CPU 272 is changed (S180: Yes, S182). When it is determined not to change the mode signal MOD, the mode signal MOD to be output to each of the ARC circuit 220 and the CPU 272 is maintained at the current mode signal MOD (S180: No).

Figure 20:
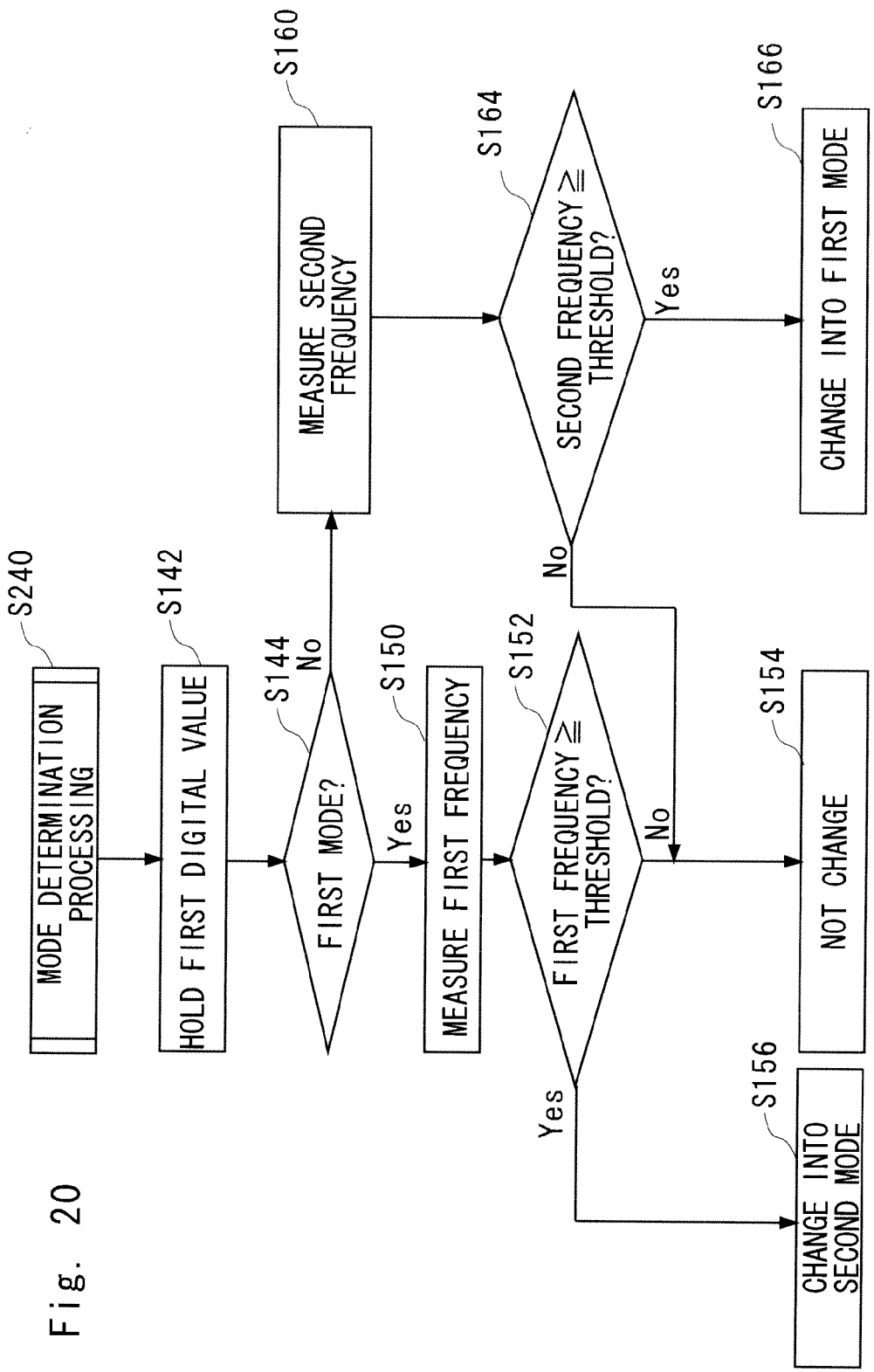
FIG. 20 is a flowchart showing mode determination processing shown in FIG. 19.

FIG. 20 shows details of the mode determination processing in step S140 of FIG. 19. In the mode control unit 240, the first digital value S1 obtained from the A/D converter 230 is held in the shift register 244 (S142).

When the current mode signal MOD is the first mode signal MOD, the mode control execution unit 246 measures the first frequency for the five first digital values S1 held in the shift register 244 (S144: Yes, S150). When the measured first frequency is less than the threshold (for example, three), it is determined to maintain the current mode signal MOD, i.e., the first mode signal MOD (S152: No, S154). On the other hand, when the first frequency is equal to or more than the threshold, it is determined to change the mode signal MOD in the subsequent sequence from the first mode signal MOD to the second mode signal MOD (S152: Yes, S156).

When the current mode signal MOD is the second mode signal MOD, the mode control execution unit 246 measures the second frequency for the five first digital values S1 held in the shift register 244 (S144: No, S160). When the second frequency is less than the threshold (for example, three), it is determined to maintain the current mode signal MOD, i.e., the second mode signal MOD (S164: No, S154). On the other hand, when the second frequency is equal to or more than the threshold (S164: Yes), it is determined to change the mode signal MOD in the subsequent sequence from the second mode signal MOD to the first mode signal MOD (S166).

The digital control power supply 200 is an embodiment of the digital control power supply 100C shown in FIG. 17, and can obtain all the advantageous effects that are explained above in connection with the digital control power supply 100C.

<Second Embodiment>

A second embodiment is also a digital control power supply. This digital control power supply is similar to the digital control power supply 200, except that this digital control power supply includes three modes. To avoid redundancy of illustration, the digital control power supply of the second embodiment will be described with reference to the functional blocks of the digital control power supply 200. In the digital control power supply of the second embodiment, the description of the components similar to those of the digital control power supply 200 is omitted.

Figure 21:
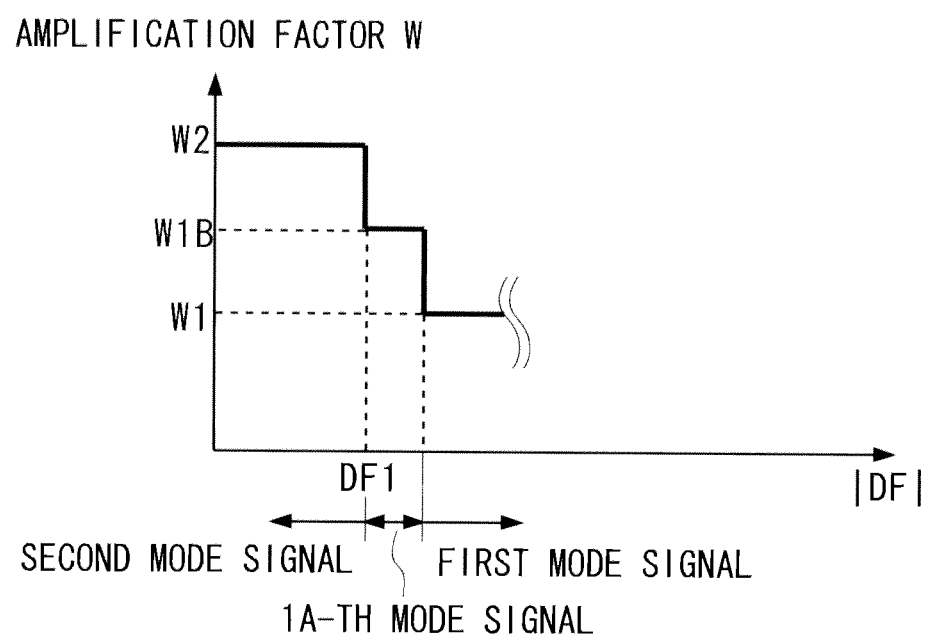
FIG. 21 is a graph for explaining each mode signal in a digital control power supply according to a second embodiment.

In the second embodiment, the mode control unit 240 outputs one of three mode signals MOD, i.e., a first mode signal MOD, a 1A-th mode signal MOD, and a second mode signal MOD. The first mode signal MOD and second mode signal MOD are respectively similar to the first mode signal MOD and second mode signal MOD described above. These three mode signals will be described with reference to FIG. 21.

An amplification factor W1B indicated by the 1A-th mode signal MOD is between the amplification factor W1 indicated by the first mode signal MOD and the amplification factor W2 indicated by the second mode signal MOD. Assume herein that in the case of the 1A-th mode signal MOD, the adjustment range of the smoothed voltage V0 is from VB1 to VB2 (referred to as "adjustment range RA"). Specifically, in the 1A-th mode, the ARC circuit 220 converts the smoothed voltage V0 within the range of VB1 to VB2 into the A/D conversion range of the A/D converter 230, e.g., 2 V to 0 V.

Figure 22:
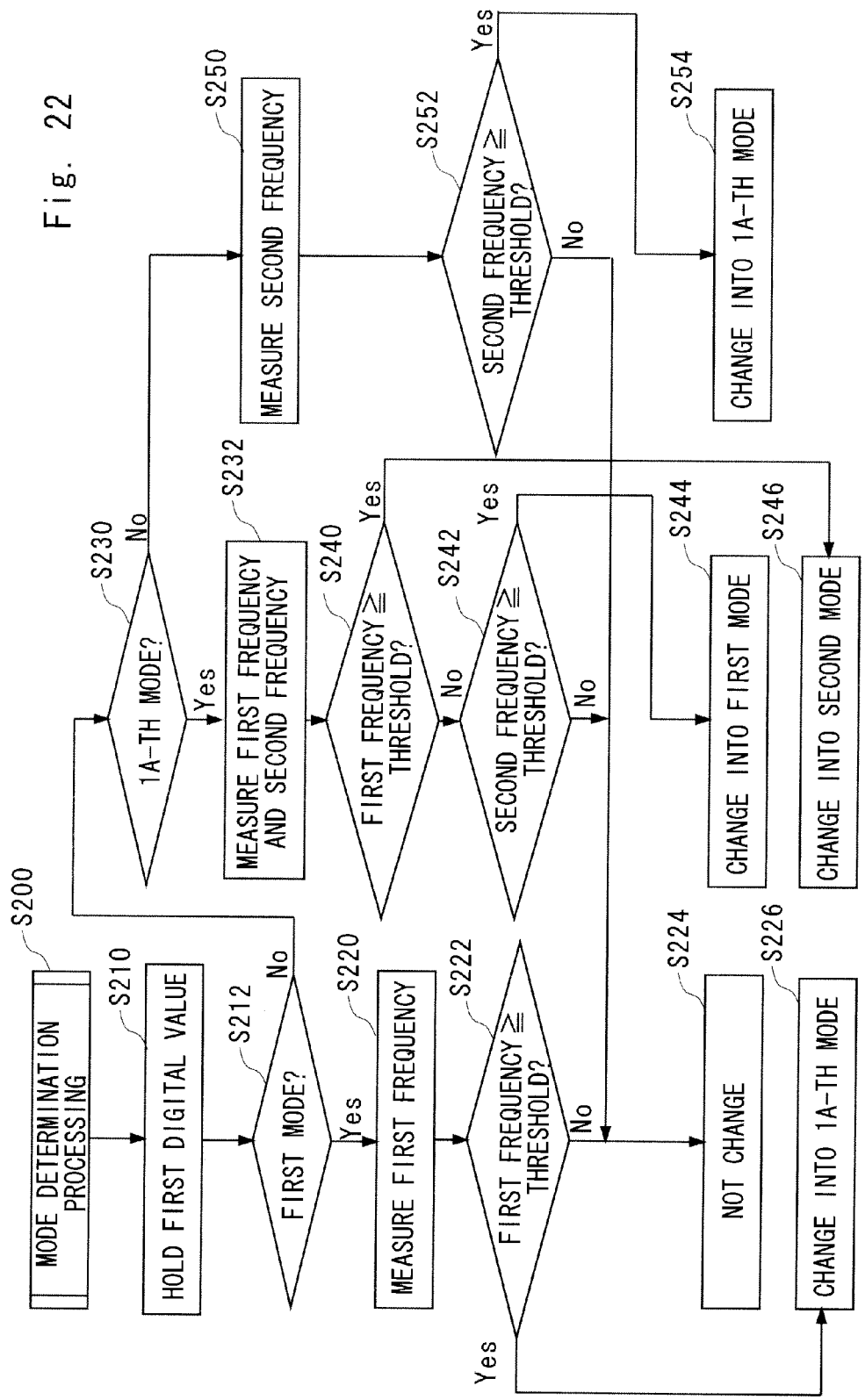
FIG. 22 is a flowchart showing mode determination processing in the digital control power supply according to the second embodiment.

FIG. 22 is a flowchart showing mode determination processing S200 performed by the mode control unit 240 in the second embodiment. The flowchart shown in FIG. 22 corresponds to the flowchart shown in FIG. 20, and illustrates the processing carried out in place of step S140 in FIG. 19.

As shown in FIG. 22, in the mode control unit 240, the first digital value S1 obtained from the A/D converter 230 is held in the shift register 244 (S210).

When the current mode signal MOD is the first mode signal MOD, the mode control execution unit 246 measures the first frequency for the five first digital values S1 held in the shift register 244 (S212: Yes, S220). When the first frequency is less than the threshold, it is determined to maintain the current mode signal MOD, i.e., the first mode signal MOD (S222: No, S224). On the other hand, when the first frequency is equal to or more than the threshold, it is determined to change the mode signal MOD in the subsequent sequence from the first mode signal MOD to the 1A-th mode signal MOD (S222: Yes, S226).

When the current mode signal MOD is the 1A-th mode signal MOD (S212: No, S230: Yes), the mode control execution unit 246 measures the first frequency and the second frequency for the five first digital values S1 held in the shift register 244 (S232).

When both the first frequency and the second frequency are less than the threshold, it is determined to maintain the current mode signal MOD, i.e., the 1A-th mode signal MOD (S240: No, S242: No, S224). On the other hand, when the first frequency is equal to or more than the threshold, it is determined to change the mode signal MOD to the second mode signal MOD (S240: Yes, S246), and when the second frequency is equal to or more than the threshold, it is determined to change the mode signal MOD to the first mode signal MOD (S240: No, S242: Yes, S244).

In the case of the second mode signal MOD (S230: No), the second frequency is measured (S250). When the second frequency is less than the threshold, it is determined to maintain the current mode signal MOD, i.e., the second mode signal MOD (S252: No, S224). On the other hand, when the second frequency is equal to or more than the threshold (S252: Yes), it is determined to change the mode signal MOD from the second mode signal MOD to the 1A-th mode signal MOD (S254).

Figure 23:
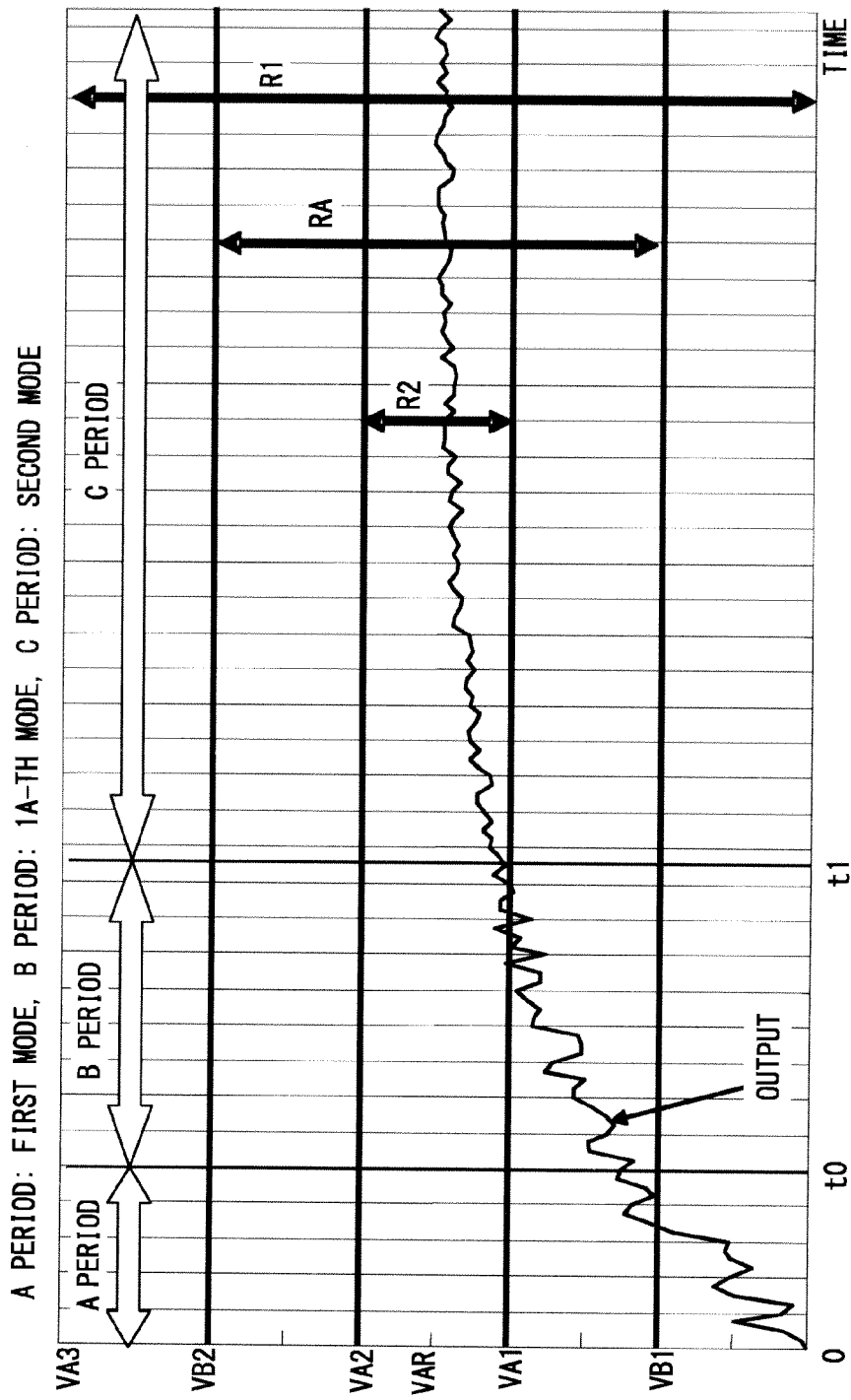
FIG. 23 is a graph for explaining an example of control by the digital control power supply according to the second embodiment.

FIG. 23 shows an example of processing performed by the digital control power supply according to the second embodiment. A period between time 0 at power-on and timing t0, a period between timing t0 and timing t1, and a period after timing t1 are respectively referred to as "A period", "B period", and "C period". In the A period, the first mode signal MOD is applied. In the B period, the 1A-th mode signal MOD is applied. In the C period, the second mode signal MOD is applied. The bit accuracy of the A/D conversion performed by the A/D converter 230 increases in the order of the A period, the B period, and the C period.

That is, in the second embodiment, the control mode is further divided into the first mode and the 1A-th mode in the rising period. Accordingly, the advantageous effect of reducing quantization noise of the A/D converter in the rising period can be obtained. For this reason, operation errors in the output control unit 270 can be further reduced and the stability of the smoothed output V0 can be further improved.

The digital control power supply of the second embodiment can obtain all the advantageous effects of the digital control power supply 200 of the first embodiment.

<Third Embodiment>

A third embodiment is also a digital control power supply. This digital control power supply is similar to the digital control power supply 200 shown in FIG. 18, except that an LPF (low-pass filter) is applied to the five first digital values S1 held in the shift register 244 in the case of measuring the first frequency and the second frequency. To avoid redundancy of illustration, the digital control power supply of the third embodiment will be described with reference to the functional blocks of the digital control power supply 200. In the digital control power supply of the third embodiment, the description of the components similar to those of the digital control power supply 200 is omitted.

Figure 24:
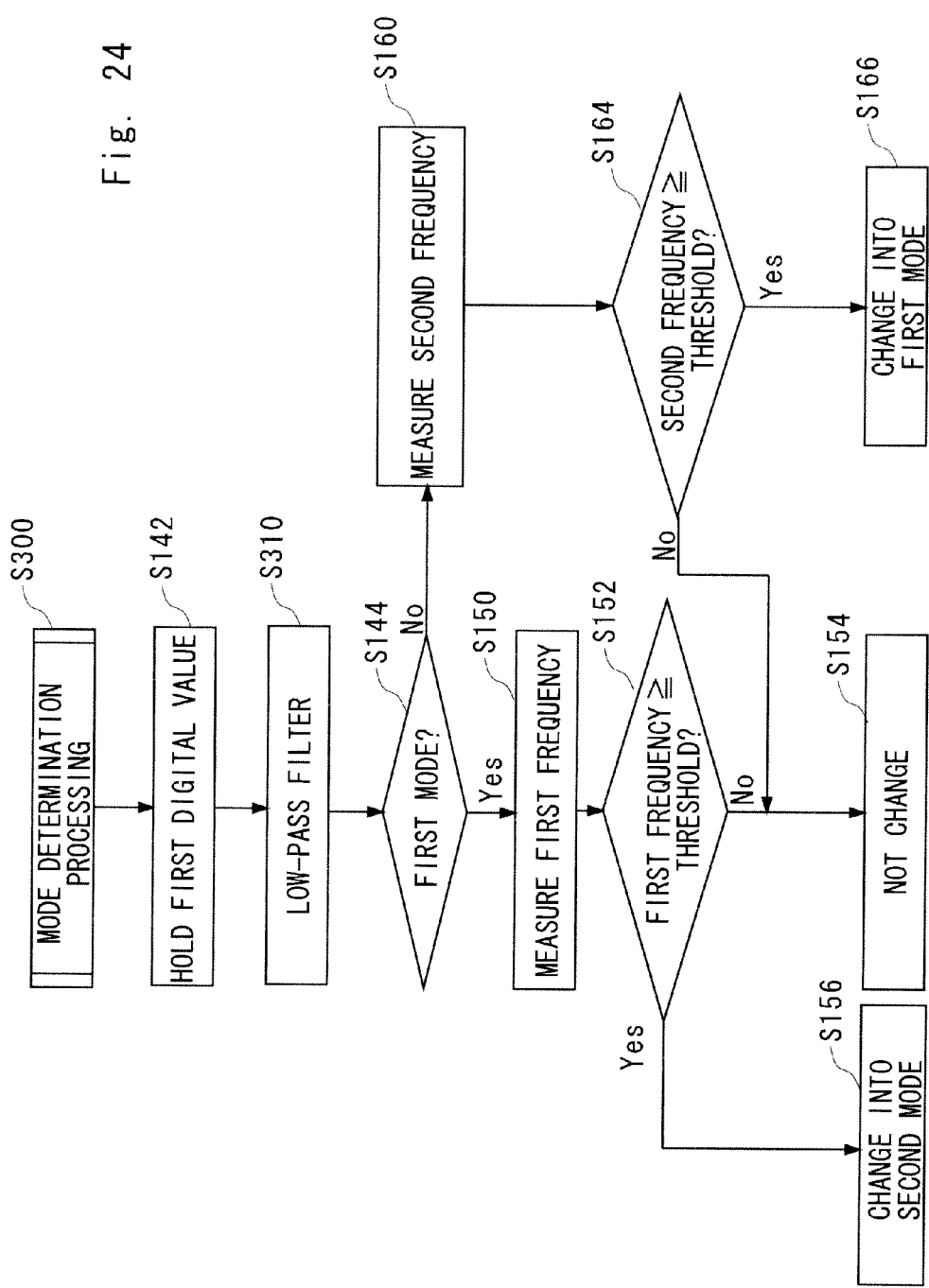
FIG. 24 is a flowchart showing mode determination processing in a digital control power supply according to a third embodiment.

FIG. 24 is a flowchart showing mode determination processing in the digital control power supply of the third embodiment. The flowchart shown in FIG. 24 corresponds to the flowchart shown in FIG. 20, and illustrates the processing carried out in place of step S140 in FIG. 19.

As shown in FIG. 24, according to this embodiment, in mode determination processing S300, the LPF is applied to the five first digital values S1 held in the shift register 244 (S310) to measure the first frequency or the second frequency. This LPF limits the bandwidth to a required range for the first digital value S1, and extracts only signal components. This enables attenuation of noise that periodically occurs, for example. As a result of determining the mode as described above, errors in the operation for the duty value in the output control unit 270 can be reduced and a highly accurate PWM waveform can be obtained.

<Fourth Embodiment>

Figure 25:
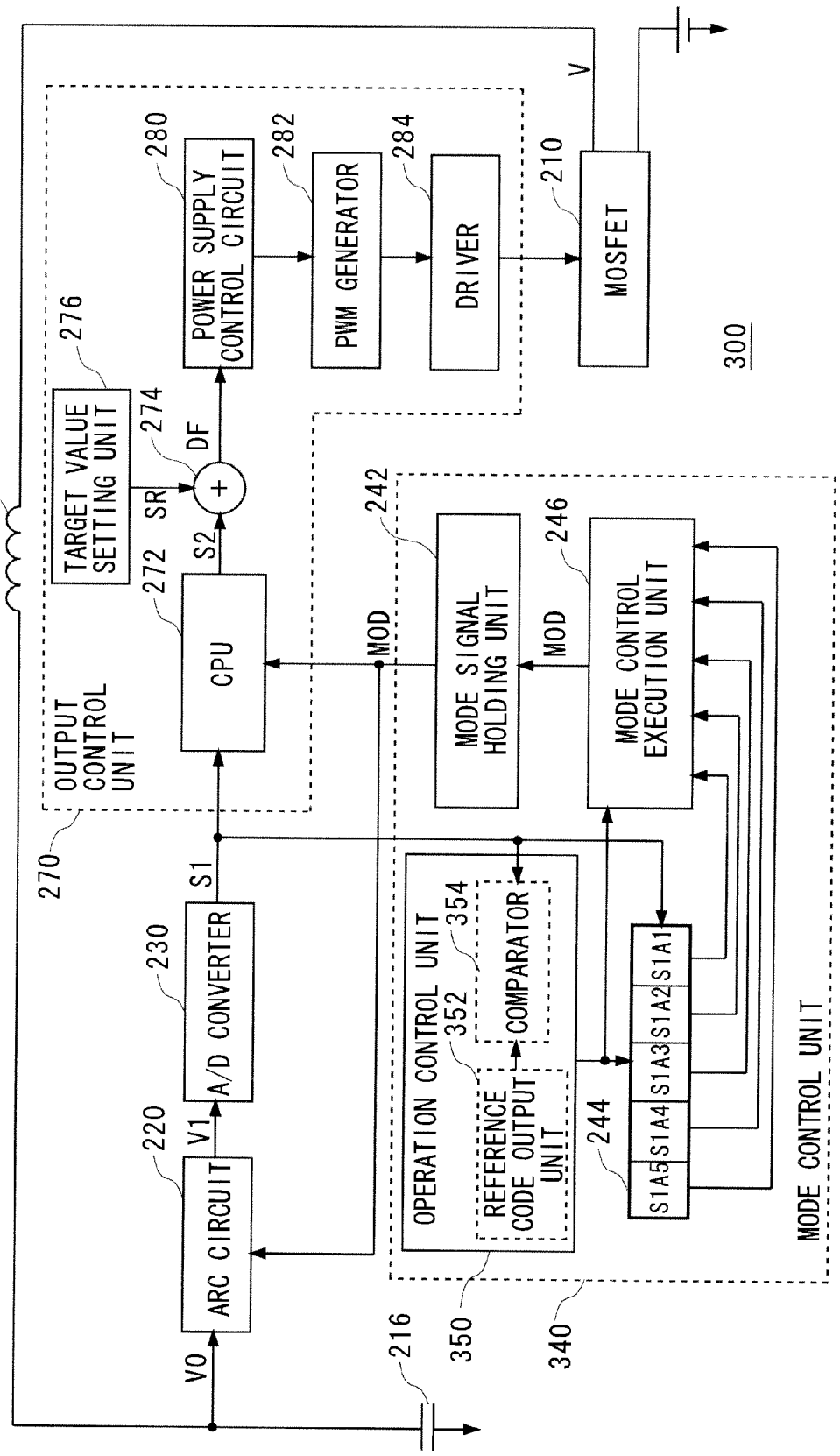
FIG. 25 is a diagram showing a digital control power supply according to a fourth embodiment.
Figure 26:
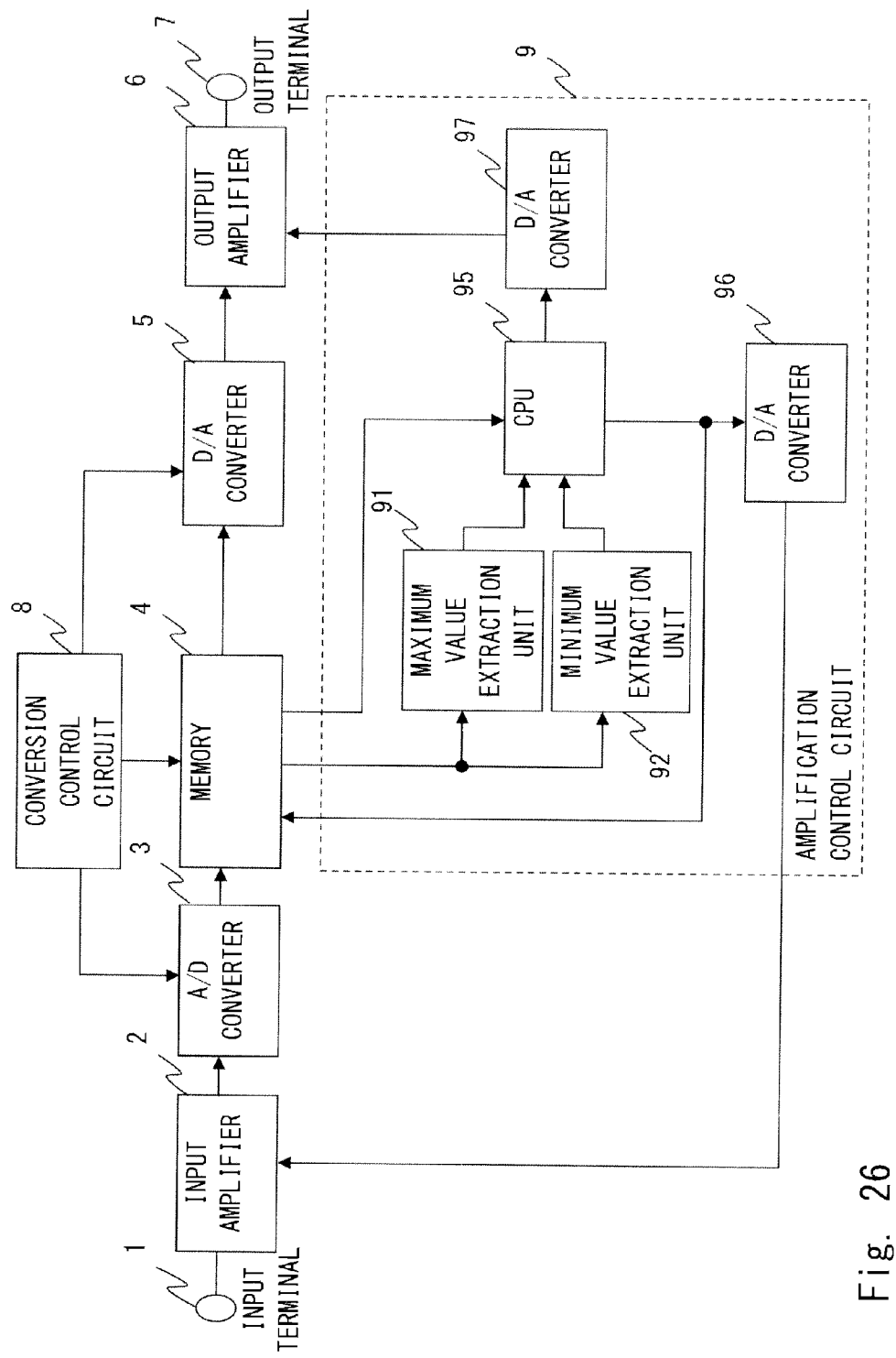
FIG. 26 corresponds to FIG. 1 of Japanese Unexamined Patent Application Publication No. 07-131350.

FIG. 25 shows a digital control power supply 300 according to a fourth embodiment. The digital control power supply 300 is similar to the digital control power supply 200 shown in FIG. 18, except that a mode control unit 340 is different from the mode control unit 240 of the digital control power supply 200. The other functional blocks of the digital control power supply 300 are similar to the respective functional blocks of the digital control power supply 200. The mode control unit 340 is similar to the mode control unit 240, except that the mode control unit 340 further includes an operation control unit 350. Here, only the operation control unit 350 will be described.

The operation control unit 350 is configured to activate and stop the shift register 244 and the mode control execution unit 246, and includes a reference code output unit 352 and a comparator 354.

The reference code output unit 352 stores references codes for the first digital value S1. The reference codes are set to the respective mode signals MOD to measure the first frequency and the second frequency. The reference code output unit 352 outputs each reference code corresponding to the current mode signal MOD to the comparator 354. For example, in the case of the first mode signal MOD, the reference code output unit 352 outputs SA4 and SA3 shown in FIG. 16 to the comparator 354. In the case of the second mode signal MOD, the reference code output unit 352 outputs Smin and Smax shown in FIG. 16 to the comparator 354.

The comparator 354 receives the first digital value S1 from the A/D converter 230, and compares the first digital value S1 with each reference code supplied from the reference code output unit 352.

The operation control unit 350 controls the shift register 244 and the mode control execution unit 246 based on the comparison result of the comparator 354. Specifically, in the first mode, when the first digital value S1 falls within the range of SA4 and SA3, the shift register 244 and the mode control execution unit 246 are activated. Further, in the second mode, when the first digital value S1 reaches Smin or Smax, the shift register 244 and the mode control execution unit 246 are activated. Then, five first digital values S1 are held in the shift register 244 and are subjected to the mode determination processing by the mode control execution unit 246. After that the operations of the shift register 244 and the mode control execution unit 246 are stopped.

In the digital control power supply 300 of this embodiment, the shift register 244 and the mode control execution unit 246 are controlled so as to operate only when they are necessary. This contributes to a reduction in power consumption of the shift register 244 and the mode control execution unit 246. The processing of the operation control unit 350 is simple and the power consumption thereof is lower than that of the mode control unit 240. Consequently, the overall power consumption of the digital control power supply 300 can be reduced.

While the invention has been described in terms of several embodiments, those skilled in the art will recognize that the invention can be practiced with various modifications within the spirit and scope of the appended claims and the invention is not limited to the examples described above.

For example, the output voltage of each digital control power supply is controlled in the above embodiments. However, the technique according to the aspect can also be applied to a control for an output current of each digital control power supply.

While the same threshold is set to the first frequency and the second frequency in the above embodiments, different thresholds may be set to the first frequency and the second frequency.

While the A/D converter 130 and the A/D converter 230 are described as three-bit A/D converters, for example, in the above embodiments, the number of bits of these A/D converters is not limited to three. Furthermore, the smoothed output voltage can be controlled with a bit accuracy equal to or higher than the bit accuracy of the A/D converters, regardless of the number of bits of the A/D converters.

The above embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A control device that performs digital control of an output of a power supply, comprising:
    a mode control unit that selects one of a plurality of mode signals respectively corresponding to a plurality of different amplification factors;
    an amplifier that obtains an amplified output by amplifying the output of the power supply with an amplification factor corresponding to the mode signal selected by the mode control unit;
    an A/D converter that performs an A/D conversion on the amplified output to obtain a first digital value; and
    an output control unit that converts the first digital value into a second digital value representing the output of the power supply as a predetermined bit accuracy, obtains a difference between the second digital value and a target value, and controls the output of the power supply according to the difference, the target value being a digital value for a target output of the power supply and represented as the predetermined bit accuracy, wherein when the difference is set as an index value, the mode control unit is configured to:
    select the mode signal based on the index value and a difference absolute value range that is a range of an absolute value of the difference set to each of the plurality of mode signals, the absolute value of the difference included in the difference absolute value range set to the mode signal increasing as the amplification factor corresponding to the mode signal decreases;
    measure a first frequency indicating the number of occurrences of the absolute value of the index value being equal to or less than a lower limit of the difference absolute value range set to a current mode signal, and a second frequency indicating the number of occurrences of the absolute value of the index value exceeding an upper limit of the difference absolute value range set to the current mode signal;
    maintain the current mode signal when the first frequency is less than a first threshold and the second frequency is less than a second threshold;
    select the mode signal corresponding to an amplification factor which is larger by 1 than the amplification factor corresponding to the current mode signal, when the first frequency is equal to or more than the first threshold; and
    select the mode signal corresponding to an amplification factor which is smaller by 1 than the amplification factor corresponding to the current mode signal, when the second frequency is equal to or more than the second threshold.

2. The control device according to claim 1, wherein
the mode control unit sets one of the first digital value and the second digital value as an index value in place of the difference, and
the mode control unit measures the first frequency and the second frequency and selects the mode signal based on one of a range of the first digital value and a range of the second digital value, the range of the first digital value and the range of the second digital value being set to each of the plurality of mode signals and corresponding to the difference absolute value range.

3. The control device according to claim 1, wherein the mode control unit outputs the mode signal corresponding to a minimum amplification factor among the plurality of mode signals, immediately after power-on of the power supply.

4. The control device according to claim 2, wherein the mode control unit outputs the mode signal corresponding to a minimum amplification factor among the plurality of mode signals, immediately after power-on of the power supply.

5. The control device according to claim 1, wherein the plurality of mode signals includes: a plurality of mode signals for a rising period respectively corresponding to a plurality of different stages with different magnitudes of outputs of the power supply in a rising period immediately after power-on of the power supply; and one mode signal for a stable period corresponding to a magnitude of an output of the power supply in a stable period of the rising period.

6. The control device according to claim 2, wherein the plurality of mode signals includes: a plurality of mode signals for a rising period respectively corresponding to a plurality of different stages with different magnitudes of outputs of the power supply in a rising period immediately after power-on of the power supply; and one mode signal for a stable period corresponding to a magnitude of an output of the power supply in a stable period of the rising period.

7. The control device according to claim 1, wherein the mode control unit comprises:
- a mode signal holding unit that holds the mode signals and continuously outputs the mode signals to each of the amplifier and the output control unit;
- an index value holding unit that receives the index value and updates and holds K (K is an integer equal to or more than 2) number of index values successively input; and
- a mode control execution unit that measures the first frequency and the second frequency based on the K number of index values held in the index value holding unit, and determines whether or not to change the mode signals held in the mode signal holding unit.

8. The control device according to claim 2, wherein the mode control unit comprises:
- a mode signal holding unit that holds the mode signals and continuously outputs the mode signals to each of the amplifier and the output control unit;
- an index value holding unit that receives the index value and updates and holds K (K is an integer equal to or more than 2) number of index values successively input; and
- a mode control execution unit that measures the first frequency and the second frequency based on the K number of index values held in the index value holding unit, and determines whether or not to change the mode signals held in the mode signal holding unit.

9. The control device according to claim 7, wherein the index value holding unit is a shift register.

10. The control device according to claim 8, wherein the index value holding unit is a shift register.

11. The control device according to claim 7, wherein the mode control execution unit performs low-pass filtering processing on the K number of index values held in the index value holding unit, and measures the first frequency and the second frequency.

12. The control device according to claim 8, wherein the mode control execution unit performs low-pass filtering processing on the K number of index values held in the index value holding unit, and measures the first frequency and the second frequency.

13. The control device according to claim 7, wherein
the mode control unit further comprises an operation control unit that controls the index value holding unit and the mode control execution unit, and
the operation control unit is configured to:
- determine whether the index value falls within the difference absolute value range or the digital value range corresponding to the current mode signal;
- determine whether or not to activate the index value holding unit and the mode control execution unit according to a result of the determination; and
- stop operation of each of the index value holding unit and the mode control execution unit after the mode control execution unit determines whether or not to change the mode signal upon activation of the index value holding unit and the mode control execution unit.

14. The control device according to claim 8, wherein
the mode control unit further comprises an operation control unit that controls the index value holding unit and the mode control execution unit, and
the operation control unit is configured to:
- determine whether the index value falls within the difference absolute value range or the digital value range corresponding to the current mode signal;
- determine whether or not to activate the index value holding unit and the mode control execution unit according to a result of the determination; and
- stop operation of each of the index value holding unit and the mode control execution unit after the mode control execution unit determines whether or not to change the mode signal upon activation of the index value holding unit and the mode control execution unit.

15. The control device according to claim 1, wherein the first threshold and the second threshold are set to the same value for the first frequency and the second frequency.

16. The control device according to claim 2, wherein the first threshold and the second threshold are set to the same value for the first frequency and the second frequency.

17. A digital control power supply comprising a control device according to claim 1.

18. A digital control power supply comprising a control device according to claim 2.

19. A control method that performs digital control of an output of a power supply, comprising:
- performing amplification processing on the output of the power supply to obtain an amplified output;
- performing an A/D conversion on the amplified output to obtain a first digital value;
- converting the first digital value into a second digital value representing the output of the power supply as a predetermined bit accuracy, obtaining a difference between the second digital value and a target value, and controlling the output of the power supply according to the difference, the target value being a digital value for a target output of the power supply and represented as the predetermined bit accuracy; and
- setting the difference as an index value, and performing mode control processing to control an amplification factor of the amplification processing by selecting a mode signal based on the index value and a difference absolute value range that is a range of an absolute value of the difference set to each of a plurality of mode signals respectively corresponding to a plurality of different amplification factors, the absolute value of the difference included in the difference absolute value range set to the mode signal increasing as the amplification factor corresponding to the mode signal decreases, wherein the mode control processing comprises:
- measuring a first frequency indicating the number of occurrences of the absolute value of the index value being equal to or less than a lower limit of the difference absolute value range set to a current mode signal, and a second frequency indicating the number of occurrences of the absolute value of the index value exceeding an upper limit of the difference absolute value range set to the current mode signal;
- maintaining the current mode signal when the first frequency is less than a first threshold and the second frequency is less than a second threshold;
- selecting the mode signal corresponding to an amplification factor which is larger by 1 than the amplification factor corresponding to the current mode signal, when the first frequency is equal to or more than the first threshold; and
- selecting the mode signal corresponding to an amplification factor which is smaller by 1 than the amplification factor corresponding to the current mode signal, when the second frequency is equal to or more than the second threshold.

20. The control method according to claim 19, wherein the mode control processing further comprises:
  using one of the first digital value and the second digital value as an index value, in place of the difference; and
  measuring the first frequency and the second frequency and selecting the mode signal based on one of a range of the first digital value and a range of the second digital value, the range of the first digital value and the range of the second digital value being set to each of the plurality of mode signals and corresponding to the difference absolute value range.

* * * * *